(12) United States Patent
Sahoo et al.

(10) Patent No.: US 12,021,401 B2
(45) Date of Patent: *Jun. 25, 2024

(54) SINGLE STAGE CHARGER FOR HIGH VOLTAGE BATTERIES

(71) Applicant: Apple Inc., Cupertino, CA (US)

(72) Inventors: Ashish K. Sahoo, San Jose, CA (US); Brandon Pierquet, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/153,744

(22) Filed: Jan. 12, 2023

(65) Prior Publication Data

US 2023/0208150 A1 Jun. 29, 2023

Related U.S. Application Data

(62) Division of application No. 17/032,721, filed on Sep. 25, 2020.

(51) Int. Cl.
*H02J 7/00* (2006.01)
*H02J 3/38* (2006.01)
*H02J 7/04* (2006.01)
*H02M 7/219* (2006.01)

(52) U.S. Cl.
CPC ............. *H02J 7/0014* (2013.01); *H02J 3/38* (2013.01); *H02J 7/04* (2013.01); *H02M 7/219* (2013.01)

(58) Field of Classification Search
CPC ...................................................... H02J 7/0014
USPC ......................................................... 320/107
See application file for complete search history.

(56) References Cited

U.S. PATENT DOCUMENTS

| | | | |
|---|---|---|---|
| 2016/0016479 A1* | 1/2016 | Khaligh | H01F 38/08 336/170 |
| 2016/0111971 A1* | 4/2016 | Rayner | H02M 3/1584 307/52 |
| 2018/0367026 A1* | 12/2018 | Rayner | H02M 1/14 |
| 2020/0336080 A1* | 10/2020 | Yang | H02M 1/4208 |

* cited by examiner

*Primary Examiner* — Yalkew Fantu
(74) *Attorney, Agent, or Firm* — FLETCHER YODER PC

(57) ABSTRACT

A charger for a battery power system can include first and second switching bridges with inputs couplable to an AC source, at least one transformer having two or more primary windings (connected in series and coupled to the switching bridges) and at least two secondary windings, and second rectifier/chargers, each coupled to at least one of the secondary windings and couplable to at least one battery. The switching bridges may be respectively operable during positive and negative half cycles of the AC source to deliver an AC voltage to the transformer. The rectifier/chargers may be operable in a first mode to receive an AC voltage from the transformer and deliver a DC voltage for charging the respective battery. In some multi-battery embodiments, the rectifier/chargers may also be operable in a second mode to deliver an AC voltage from a respective battery to the transformer to balance charge between the batteries.

15 Claims, 15 Drawing Sheets

SINGLE STAGE CHARGER FOR HIGH VOLTAGE BATTERIES

CROSS-REFERENCE TO RELATED APPLICATIONS

This application claims priority to U.S. patent application Ser. No. 17/032,721, filed Sep. 25, 2020, entitled "SINGLE STAGE CHARGER FOR HIGH VOLTAGE BATTERIES," the disclosure of which is incorporated by reference in its entirety for all purposes.

BACKGROUND

There have been many recent developments in AC-DC systems that include batteries for energy storage. Some such system may include relatively high voltages and/or relatively high power levels. Applications of such systems include, but are not limited to, electric vehicles, grid battery systems, battery systems for solar systems, and the like. Additionally, in some arrangements, such AC-DC systems may include multiple batteries (each comprising multiple cells), each having their own charging system as well as a system for balancing charge between the multiple batteries. Depending on the implementation of such arrangements a relatively high number of power converters, and thus a relatively high number of switching devices may be provided. This increased number of converters and switching devices can lead to increases in complexity and cost as well as decreases in reliability and efficiency.

SUMMARY

Thus, for at least some applications, it may therefore be desirable to provide switching power converters that integrate multiple converters into a single converter that reduces the number of switching devices required. For example, it may be desirable to provide single-stage chargers as described in greater detail below. Additionally, in multi-battery embodiments, it may be desirable to provide includes integrated charger/balancer circuitry, thereby reducing the number of converters and switching devices required to achieve the functional objectives of the system.

A charger/balancer for a multi-battery power system can include at least first and second switching bridges each having an input terminal configured to be coupled to an AC input power source and commonly coupled neutral terminals, at least one transformer having two or more primary windings connected in series and coupled to the at least first and second switching bridges, the transformer further comprising at least two secondary windings, and at least first and second rectifier/chargers each coupled to at least one of the secondary windings and configured to be coupled to a respective battery. The first switching bridge may be operable during a positive half cycle of the AC input power source to deliver an AC voltage to the at least one transformer, and the second switching bridge may be operable during a negative half cycle of the input power source to deliver an AC voltage to the at least one transformer. The first and second rectifier/chargers may be operable in a first mode to receive an AC voltage from the at least one transformer and deliver a DC voltage for charging the respective battery, and the first and second rectifier/chargers may be operable in a second mode to convert a DC voltage from the respective battery to an AC voltage delivered to the at least one transformer to balance charge between the first and second batteries. The first and second switching bridges may each be full bridges comprising four switching devices.

The at least one transformer can include four transformers each having a primary winding and a secondary winding, with: a first series connected primary winding including the primary winding of a first transformer coupled in series with the primary winding of a third transformer; a second series connected primary winding including the primary winding of a second transformer coupled in series with the primary winding of a fourth; and the at least two secondary windings including a first series connected secondary winding comprising the secondary winding of the first transformer coupled in series with the secondary winding of the second transformer and a second series connected secondary winding comprising the secondary winding of the third transformer coupled in series with the secondary winding of the fourth transformer. The first rectifier/charger may be coupled to the first series connected secondary winding and the second rectifier/charger may be coupled to the second series connected secondary winding.

The at least one transformer can alternatively include a single transformer having four primary windings and four corresponding secondary windings, and: a first series connected primary winding including a first primary winding coupled in series with a third primary winding; a second series connected primary winding including a second primary winding coupled in series with a fourth primary winding; and the at least two secondary windings including a first series connected secondary winding comprising the first secondary winding coupled in series with the second secondary winding and a second series connected secondary winding comprising the third secondary winding coupled in series with the fourth secondary winding. The first rectifier/charger may be coupled to the first series connected secondary winding, and the second rectifier/charger may be coupled to the second series connected secondary winding.

The first and second rectifier/chargers can all each or all be full bridges comprising four switching devices. The first and second switching bridges can also each or all be each half bridges. The first and second switching bridges can each or all be dual half bridges comprising four switching devices. The first and second half bridges may be coupled to the at least one transformer by blocking capacitors.

A charger/balancer for a multi-battery power system can include: first and second switching bridges coupled to an AC input power source; at least one transformer having at least one pair of series connected primary windings coupled to the first and second switching bridges, the transformer further having at least two secondary windings; first and second rectifier/chargers each coupled to at least one of the secondary windings and configured to be coupled to respective first and second batteries; and a controller. The controller may be configured to: operate the first switching bridge during a positive half cycle of the input power source to deliver AC voltage to the at least one transformer; operate the second switching bridge during a negative half cycle of the input power source to deliver AC voltage to the at least one transformer; operate the first and second rectifier/chargers in a first mode to convert AC voltage from the at least one transformer to DC voltage for charging the first and second batteries; and operate the first and second rectifier/chargers in a second mode to convert DC voltage from a respective battery to an AC voltage delivered to the at least one transformer to balance charge between the first and second batteries. The controller may be further configured to operate the first switching bridge during a positive half cycle of the input power source to deliver AC voltage to the at least one transformer by closing all switches of the second switching bridge and operating the switches of the first switching bridge to deliver a pulse width modulated AC voltage to the at least one transformer; and operate the second switching bridge during a negative half cycle of the input power source to deliver AC voltage to the at least one transformer by closing all switches of the second switching bridge and operating the switches of the second switching bridge to deliver a pulse width modulated AC voltage to the at least one transformer. The controller may be still further configured to operate the first and second rectifier/chargers in a second mode to convert DC voltage from a respective battery to an AC voltage delivered to the at least one transformer to balance charge between the first and second batteries by closing all switches of the first and second switching bridges and operating one of the first and second rectifier/chargers as an inverter to deliver a pulse width modulated AC voltage to the at least one transformer while operating the other of the first and second rectifier/chargers in the first mode. The controller may be further configured to operate the first and second rectifier/chargers in a second mode to convert DC voltage from a respective battery to an AC voltage delivered to the at least one transformer to balance charge between the first and second batteries by closing all switches of the first and second switching bridges and operating one of the first and second rectifier/chargers as an inverter to deliver a pulse width modulated AC voltage to the at least one transformer while operating the other of the first and second rectifier/chargers in the first mode.

A charger for a battery power system can include at least first and second switching bridges each having an input terminal configured to be coupled to an AC input power source and commonly coupled neutral terminals; at least one transformer having two or more primary windings connected in series and coupled to the at least first and second switching bridges, the transformer further comprising at least two secondary windings; and at least first and second rectifier/chargers each coupled to at least one of the secondary windings and configured to be coupled to a battery. The first switching bridge may be operable during a positive half cycle of the AC input power source to deliver an AC voltage to the at least one transformer, and the second switching bridge may be operable during a negative half cycle of the input power source to deliver an AC voltage to the at least one transformer. The first and second rectifier/chargers may be operable in a first mode to receive an AC voltage from the at least one transformer and deliver a DC voltage for charging the battery. The charger may be a charger/balancer for a multi battery system, and the first and second rectifier/chargers may be operable in a second mode to convert a DC voltage from a respective battery to an AC voltage delivered to the at least one transformer to balance charge between a first and a second batteries. The first and second switching bridges are each full bridges comprising four switching devices.

The at least one transformer can include four transformers each having a primary winding and a secondary winding, with: a first series connected primary winding including the primary winding of a first transformer coupled in series with the primary winding of a third transformer; a second series connected primary winding including the primary winding of a second transformer coupled in series with the primary winding of a fourth; and the at least two secondary windings including a first series connected secondary winding comprising the secondary winding of the first transformer coupled in series with the secondary winding of the second transformer and a second series connected secondary winding comprising the secondary winding of the third transformer coupled in series with the secondary winding of the fourth transformer. The first rectifier/charger may be coupled to the first series connected secondary winding and the second rectifier/charger is coupled to the second series connected secondary winding.

Alternatively, the at least one transformer comprises a single transformer having four primary windings and four corresponding secondary windings, with: a first series connected primary winding including a first primary winding coupled in series with a third primary winding; a second series connected primary winding including a second primary winding coupled in series with a fourth primary winding; and the at least two secondary windings including a first series connected secondary winding comprising the first secondary winding coupled in series with the second secondary winding and a second series connected secondary winding comprising the third secondary winding coupled in series with the fourth secondary winding. The first rectifier/charger may be coupled to the first series connected secondary winding and the second rectifier/charger may be coupled to the second series connected secondary winding. The first and second rectifier/chargers may be full bridges comprising four switching devices.

A charger for a battery power system can include first and second switching bridges coupled to an AC input power source; at least one transformer having at least one pair of series connected primary windings coupled to the first and second switching bridges, the transformer further having at least two secondary windings; first and second rectifier/chargers each coupled to at least one of the secondary windings and configured to be coupled to a battery; and a controller. The controller may be configured to operate the first switching bridge during a positive half cycle of the input power source to deliver AC voltage to the at least one transformer; operate the second switching bridge during a negative half cycle of the input power source to deliver AC voltage to the at least one transformer; and operate the first and second rectifier/chargers in a first mode to convert AC voltage from the at least one transformer to DC voltage for charging the battery. The controller may be further configured to operate the first and second rectifier/chargers in a second mode to convert DC voltage from a respective battery to an AC voltage delivered to the at least one transformer to balance charge between the first and second batteries. The controller may be further configured to operate the first switching bridge during a positive half cycle of the input power source to deliver AC voltage to the at least one transformer by closing all switches of the second switching bridge and operating the switches of the first switching bridge to deliver a pulse width modulated AC voltage to the at least one transformer; and operate the second switching bridge during a negative half cycle of the input power source to deliver AC voltage to the at least one transformer by closing all switches of the second switching bridge and operating the switches of the second switching bridge to deliver a pulse width modulated AC voltage to the at least one transformer.

A method of providing charging to a battery system can include operating a first switching bridge during a positive half cycle of an input power source to deliver AC voltage to at least one transformer; operating a second switching bridge during a negative half cycle of the input power source to deliver AC voltage to the at least one transformer; and operating first and second rectifier/chargers in a first mode to convert AC voltage from the at least one transformer to DC voltage for charging a battery. The method can further include operating the first switching bridge during a positive half cycle of the input power source to deliver AC voltage to the at least one transformer comprises closing all switches of the second switching bridge and operating the switches of first switching bridge to deliver a pulse width modulated AC voltage to the at least one transformer; and operating the second switching bridge during a negative half cycle of the input power source to deliver AC voltage to the at least one transformer comprises closing all switches of the second switching bridge and operating the switches of the second switching bridge to deliver a pulse width modulated AC voltage to the at least one transformer. The method further can further include providing balancing to a dual battery system by operating the first and second rectifier/chargers in a second mode to convert DC voltage from a respective battery to an AC voltage delivered to the at least one transformer to balance charge between the first and second batteries. Operating the first and second rectifier/chargers in a second mode to convert DC voltage from a respective battery to an AC voltage delivered to the at least one transformer to balance charge between the first and second batteries can include closing all switches of the first and second switching bridges and operating one of the first and second rectifier/chargers as an inverter to deliver a pulse width modulated AC voltage to the at least one transformer while operating the other of the first and second rectifier/chargers in the first mode.

DETAILED DESCRIPTION

Figure 1:
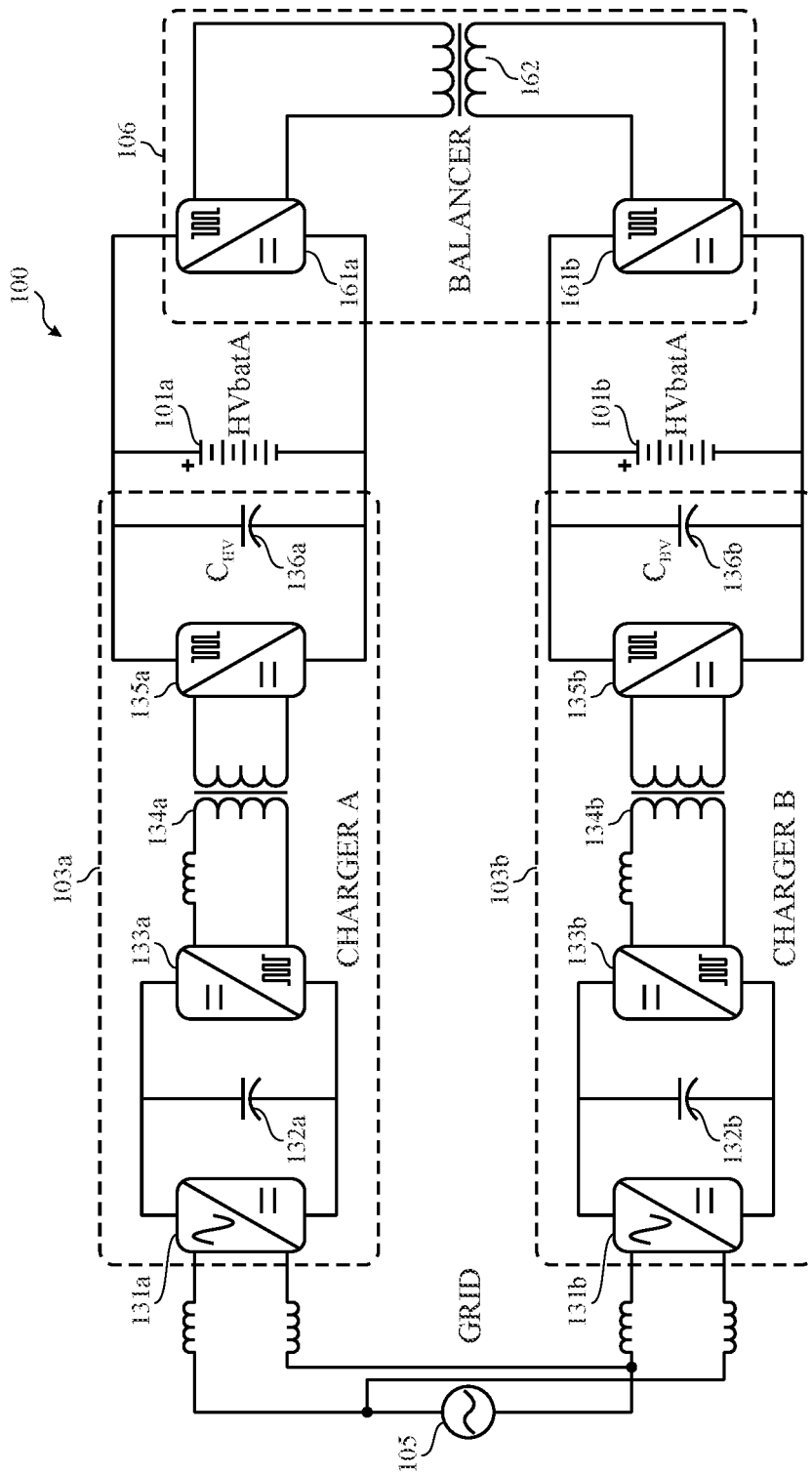
FIG. 1 illustrates a charger-balancer system for dual batteries.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a block diagram of a multi-battery AC-DC system 100 with separately implemented chargers and balancers. More specifically, multi-battery AC-DC system 100 can include a first battery 101a and a second battery 101b. In some applications these batteries may be relatively high voltage batteries, e.g., having a nominal voltage on the order of a few to several hundred volts. First battery 101a may be provided with a first charger 103a that can charge the first battery from an AC power grid 105. (In some embodiments, AC power grid 105 may alternatively be a DC power source, such as a photovoltaic system. This will change the construction of charger 103a slightly, as discussed in greater detail below.) Similarly, second battery 101b may be provided with a second charger 103b that can charge the second battery from the AC power grid 105 (or, in some applications, a DC source). Additionally, balancer circuitry 106 may be provided to equalize charge between first battery 101a and 101b. Each of chargers 103a and 103b and balancer circuitry 106 are discussed in greater detail below.

First charger 103a and second charger 103b can each include a plurality of converter blocks that perform a power conversion function necessary to convert the received AC input voltage from AC power grid 105 to DC power suitable for charging first and second batteries 101a and 101b. More specifically, chargers 103a/103b can include rectifiers 131a/131b that convert the received sinusoidal AC input voltage to a DC voltage. Rectifiers 131a/131b may be constructed of switching components such as diodes, silicon controlled rectifiers (SCRs/thyristors), or transistors, such as MOSFETs or IGBTs. These semiconductor components may be made from various semiconductor technologies including silicon, silicon carbide (SiC), or gallium nitride (GaN), as appropriate for a given application. Depending on the nature of AC input grid, rectifiers 131a/131b may be single phase, split phase, or polyphase (e.g., three-phase), with the particular rectifier topologies selected appropriately. Alternatively, in embodiments in which the grid is a DC source, rectifiers 131a/131b may be omitted, and the input DC voltage may be provided directly to bus capacitors 132a/132b and inverters 133a/133b, discussed in greater detail below.

In either case, a DC voltage may be provided to inverters 133a/133b via a DC bus supported by capacitors 132a/132b.

Inverters 133a/133b can convert the DC voltage to a pulse width modulated (PWM) AC voltage that may be supplied to transformers 134a/134b. Like rectifiers 131a/131b, the inverters may be made from suitable semiconductor switching devices made using a suitable semiconductor material/technology and may have any suitable topology and phase configuration. Transformers 134a/134b can provide galvanic isolation between the battery system and the input power source Transformers 134a/134b may also change the voltage level of the PWM AC voltage produced by inverters 133a/133b, or, alternatively, can be 1:1 transformers that do not change the voltage level. In some embodiments, the AC voltage received by chargers 103a/103b may be provided directly to the transformers 134a/134b, omitting the rectifiers 131a/131b and inverters 133a/133b. In this case, a sinusoidal voltage will be provided rectifier/chargers 135a/135b. In still other embodiments, rectifiers 131a/131b and inverters 133a/133b may be integrated into a single stage charger, discussed in greater detail below with respect to FIGS. 2A and 2B.

Chargers 103a/103b may also include rectifier/chargers 135a/135b that rectify the transformed PWM AC voltage to a variable/controllable DC voltage that may be provided to the battery via a battery bus supported by capacitors 136a and 136b. Rectifier/chargers 135a/135b may be constructed in any suitable topology, using switching devices of any suitable type/material, such as those listed above. Rectifier/chargers 135a/135b may be controlled to produce a variable DC output voltage corresponding to a desired charging program/configuration for batteries 101a/101b.

To summarize, chargers 103a/103b may operate to convert power received from an input grid 105 to a DC level suitable for charging batteries 101a and 101b, respectively. In at least some embodiments, chargers 103a and 103b operate independently. As a result, and depending further on the nature of the loads presented to batteries 101a/101b, there may arise significant differences in the amount of energy stored in batteries 101a/101b. Thus, in some cases, it may be desirable to equalize or balance the charge as between batteries 101a/101b. Balancer circuitry 106 may be provided to achieve this objective.

A variety of configurations for balancer circuitry 106 may be provided. In the illustrated embodiment, balancer 106 includes a first bidirectional rectifier/inverter 161a and a second bidirectional rectifier/inverter 161b, which have their DC sides coupled respectively to batteries 101a and 101b and their AC sides coupled to balancer transformer 162. To equalize charge as between the batteries, the rectifier/inverter coupled to the battery having excess charge may be operated as an inverter to deliver AC power, via balancer transformer 162 to the rectifier/inverter coupled to the battery having an energy deficit. The rectifier/inverter coupled to the battery having an energy deficit may be operated as a rectifier/charger to deliver energy to the coupled battery. It will be appreciated that the bidirectional nature of each converter means that excess charge may be delivered from either battery to its counterpart. It will be appreciated that balancer transformer 162 provides galvanic isolation between the two battery systems. However, in some embodiments, balancer 106 may be constructed using a single bi-directional DC-DC converter omitting balancer transformer 162.

Figure 2A:
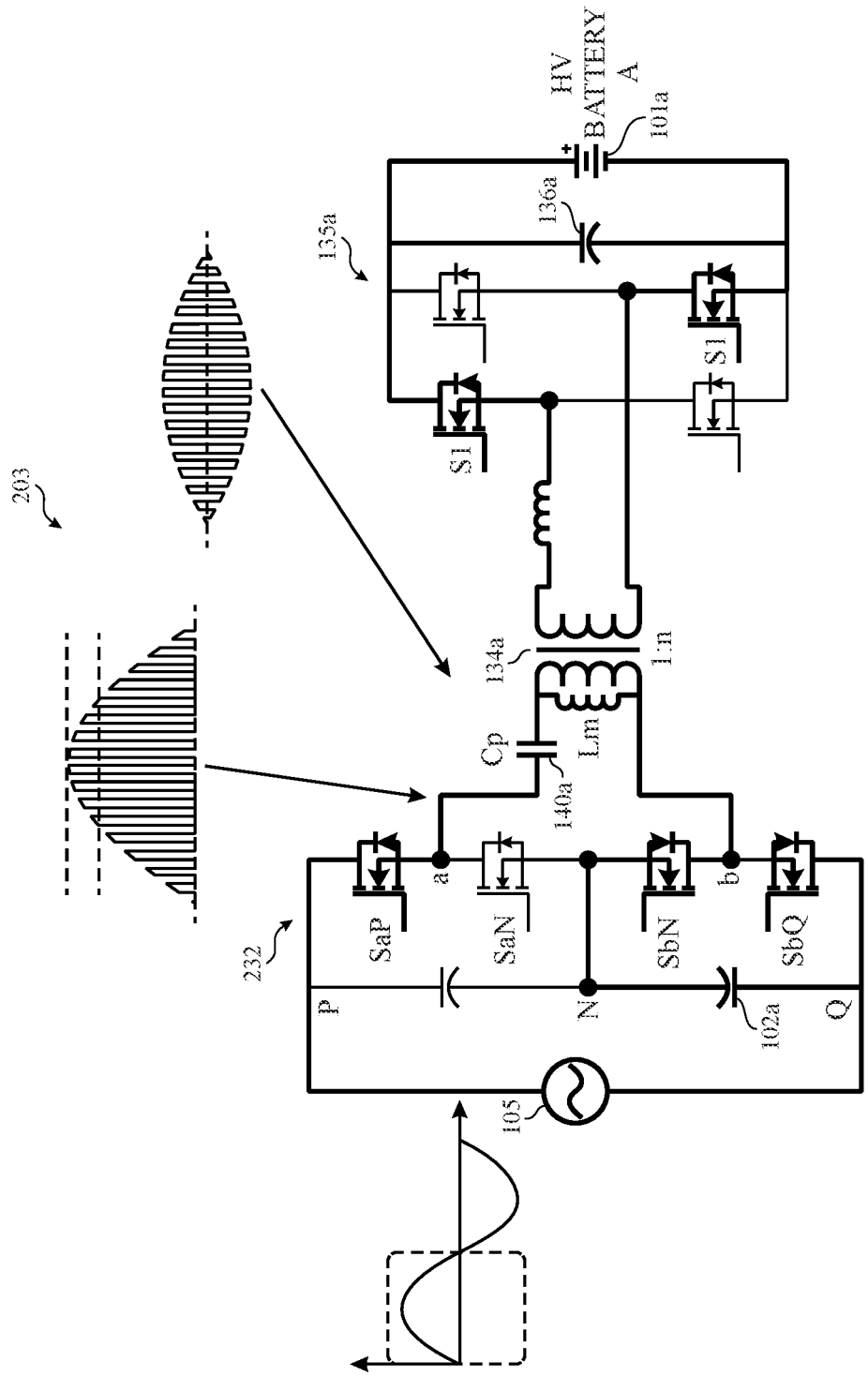
FIGS. 2A-2B illustrate the switching scheme for a charger of a single battery system.
Figure 2B:
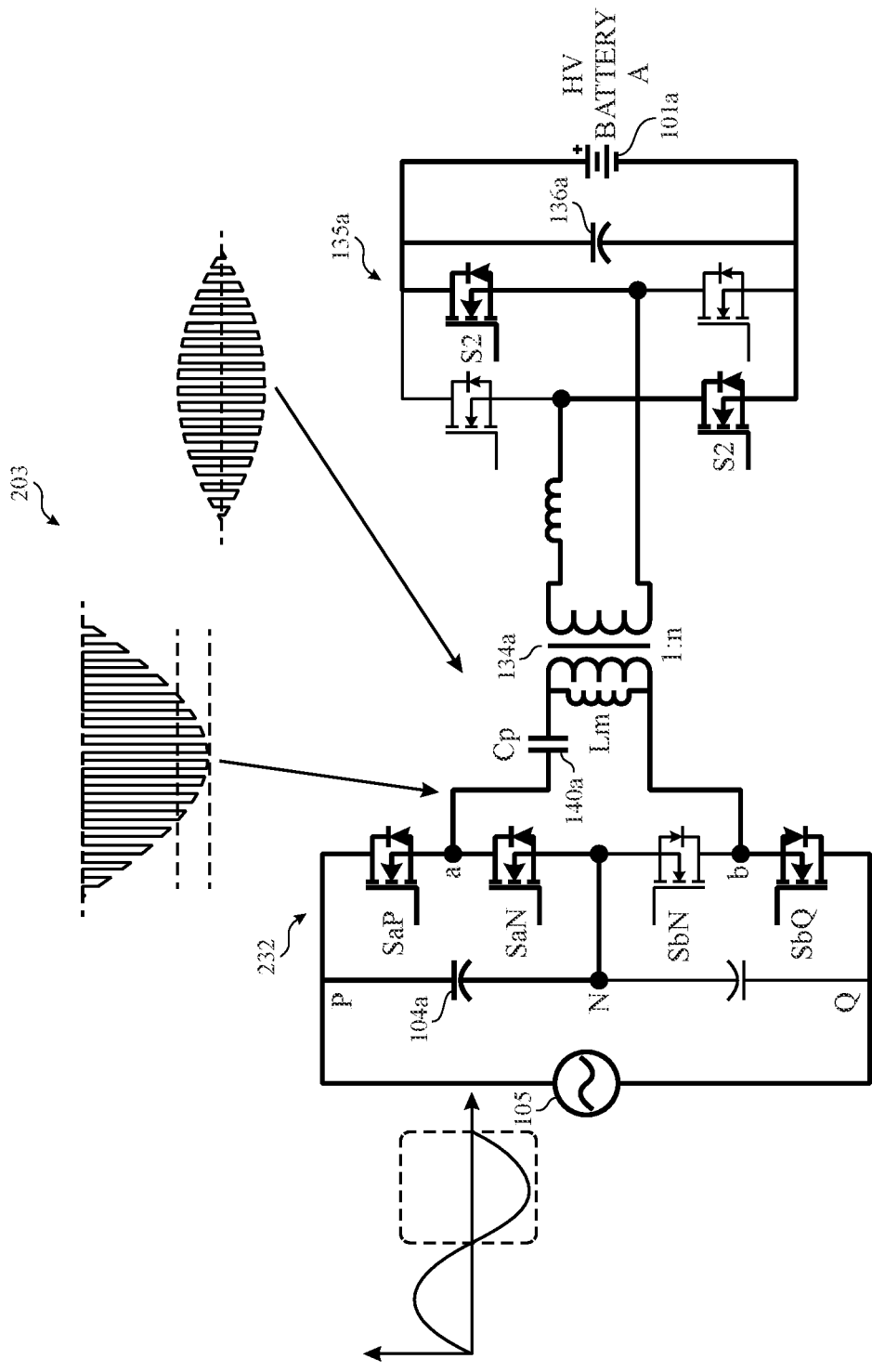

FIGS. 2A and 2B illustrate operation of a single stage charger 203 during an positive half cycle (FIG. 2A) and negative half cycle (FIG. 2B) of an AC input waveform. Single stage charger 203 integrates the input rectifier 131a/131b and inverter 133a/133b into a single switching stage 232 made up of a ladder of switching devices SaP, SaN, SbN, and SbQ, which may be operated as described in greater detail below. It will be further appreciated that the illustrated arrangement corresponds to a single phase AC input and that other configurations may be used with split phase or polyphase (e.g., three phase) AC input arrangements.

During the positive half cycle of the AC input waveform, switches SbN and SbQ may be closed, effectively short circuiting input capacitor 102a, and providing a return current path from transformer 134a. Switch SaP may be operated using a suitable pulse width modulation scheme to provide a positive half cycle AC voltage at the input of transformer 134a (via blocking capacitor 140a) that may have a peak voltage equal to approximately one-half the AC input voltage. Similarly, during the negative half cycle of the AC input waveform, switches SaP and SaN may be closed, effectively short circuiting input capacitor 102a, and providing a return current path from transformer 134a. Switch SbQ may be operated using a suitable pulse width modulation scheme to provide a negative half cycle AC voltage at the input of transformer 134a (via blocking capacitor 140a) that may have a peak voltage equal to approximately one-half the AC input voltage.

As a result of the foregoing switching operations, transformer 134a is driven with a pulse-modulated sinusoidal voltage that is suitable scaled by the turns ratio of the transformer to produce an AC voltage on the secondary side of the transformer. During the positive half cycle, switches S1 of rectifier 135a may be closed (with switches S2 open), allowing energy to be delivered to battery 101a. During the negative half cycle, switches S2 of rectifier 135a may be closed (with switches S1 open), also allowing energy to be delivered to battery 101a.

Figure 3:
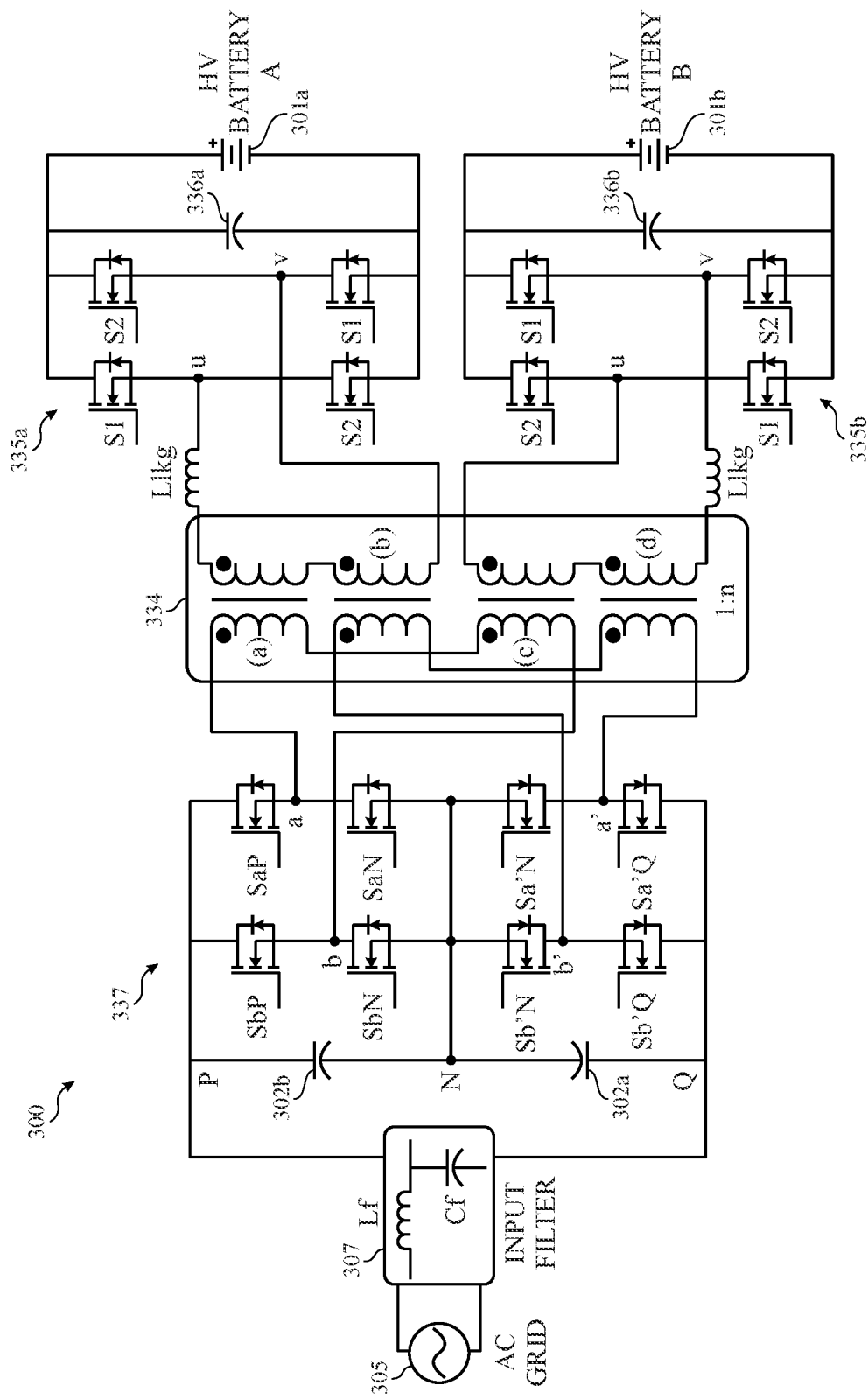
FIG. 3 illustrates a full bridge single stage charger-balancer for a dual battery system.

FIG. 3 illustrates a dual-battery AC-DC system 300 including an improved single stage charger with integrated balancer functionality. As discussed above with respect to FIG. 1, system 300 includes first and second batteries 301a and 301b. In at least some embodiments these batteries may be high voltage batteries, e.g., batteries having voltage on the order of a few hundred to several hundred volts, though other voltage are also possible. System 300 may be configured to receive AC input power from an AC grid 305 via an input filter 307. Construction of such input filters is known to those skilled in the art and is therefore not repeated here. System 300 further includes an integrated charger/balancer configuration including full bridge input circuitry 337, transformer 334, and rectifier/chargers 335a/335b, operation of which is discussed below with respect to FIGS. 5A and 5B.

Figure 4:
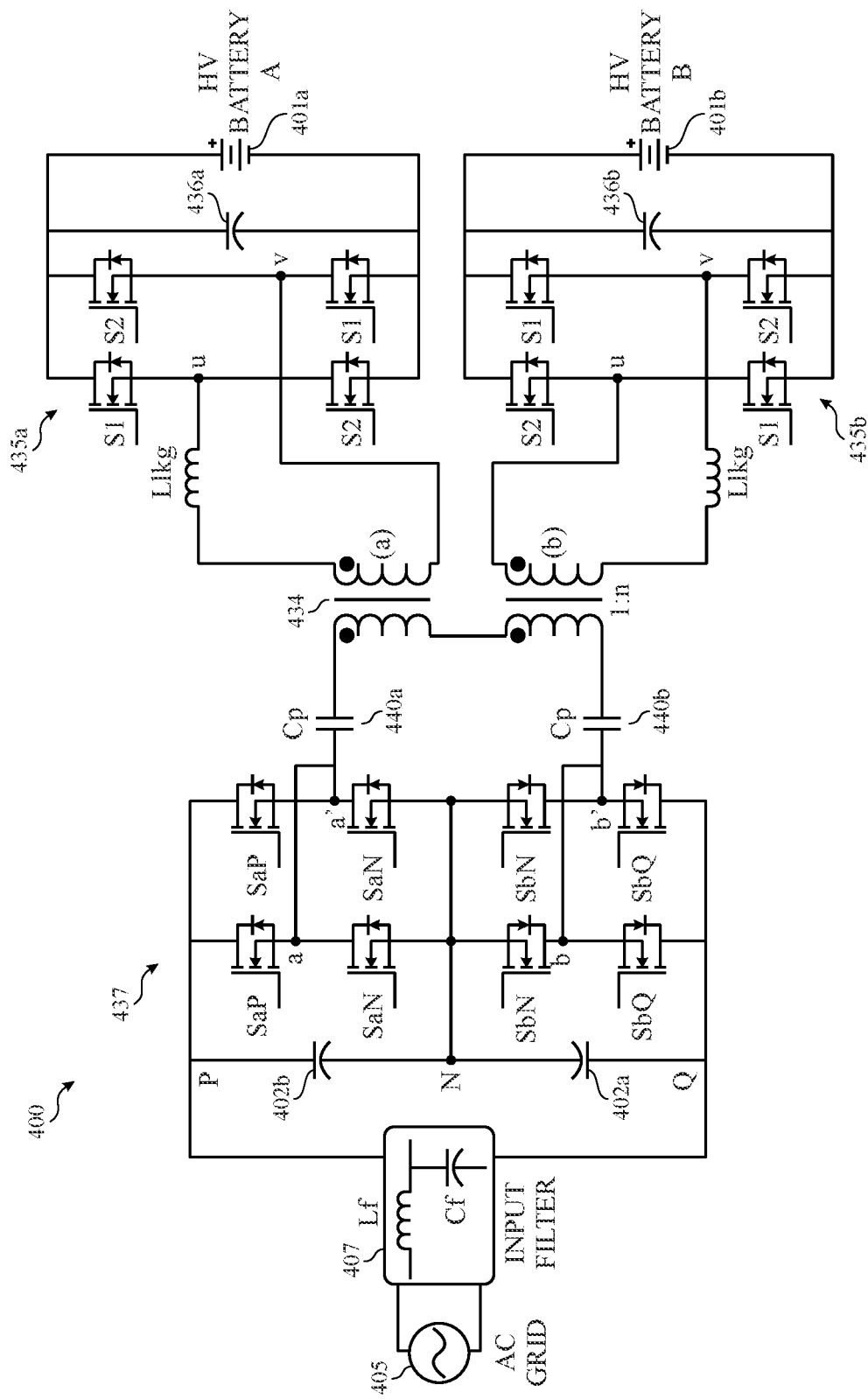
FIG. 4 illustrates a half bridge single stage charger-balancer for a dual battery system.

FIG. 4 illustrates a dual-battery AC-DC system 400 including an improved single stage charger with integrated balancer functionality. As discussed above with respect to FIGS. 1 and 3, system 400 includes first and second batteries 401a and 401b. In at least some embodiments these batteries may be high voltage batteries, e.g., batteries having voltage on the order of a few hundred to several hundred volts, though other voltage are also possible. System 400 may be configured to receive AC input power from an AC grid 405 via an input filter 407. Construction of such input filters is known to those skilled in the art and is therefore not repeated here. System 400 further includes an integrated charger/balancer configuration including half bridge input circuitry 437, transformer 434, and rectifier/chargers 435a/435b, operation of which is discussed below with respect to FIGS. 6A and 6B.

Figure 5A:
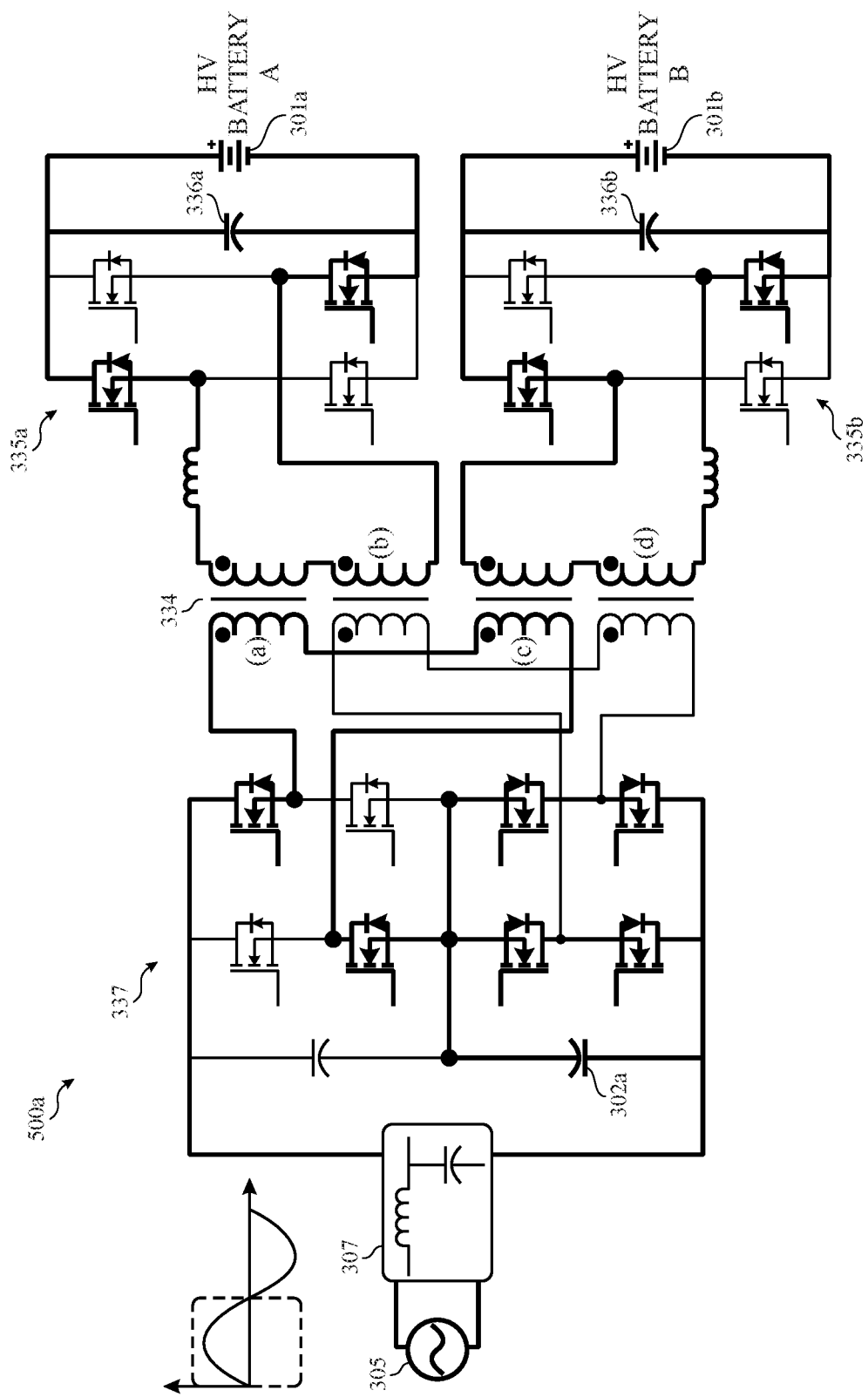
FIGS. 5A-5C illustrate a switching scheme for a full bridge single stage charger-balancer for a dual battery system.
Figure 5B:
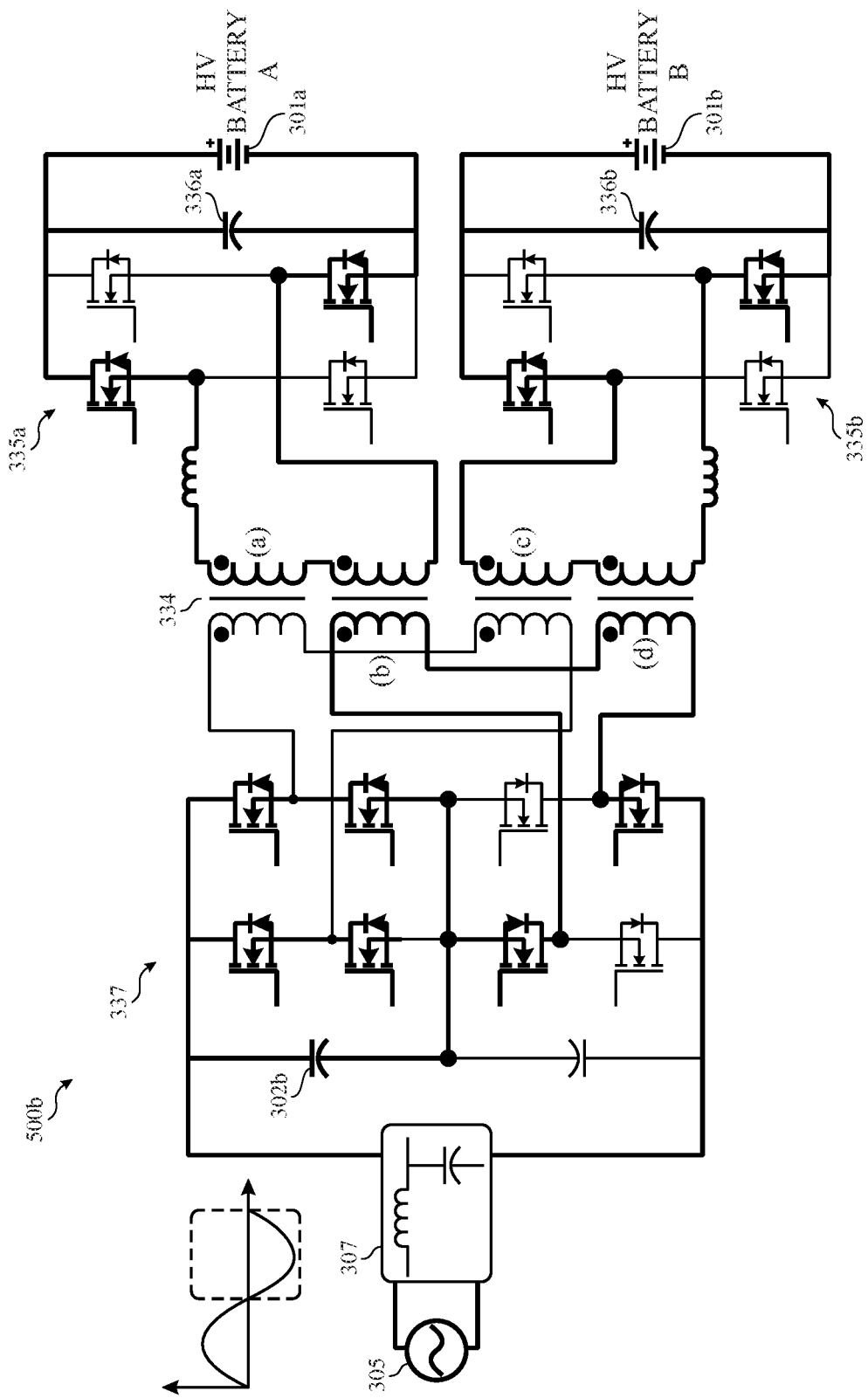
Figure 6A:
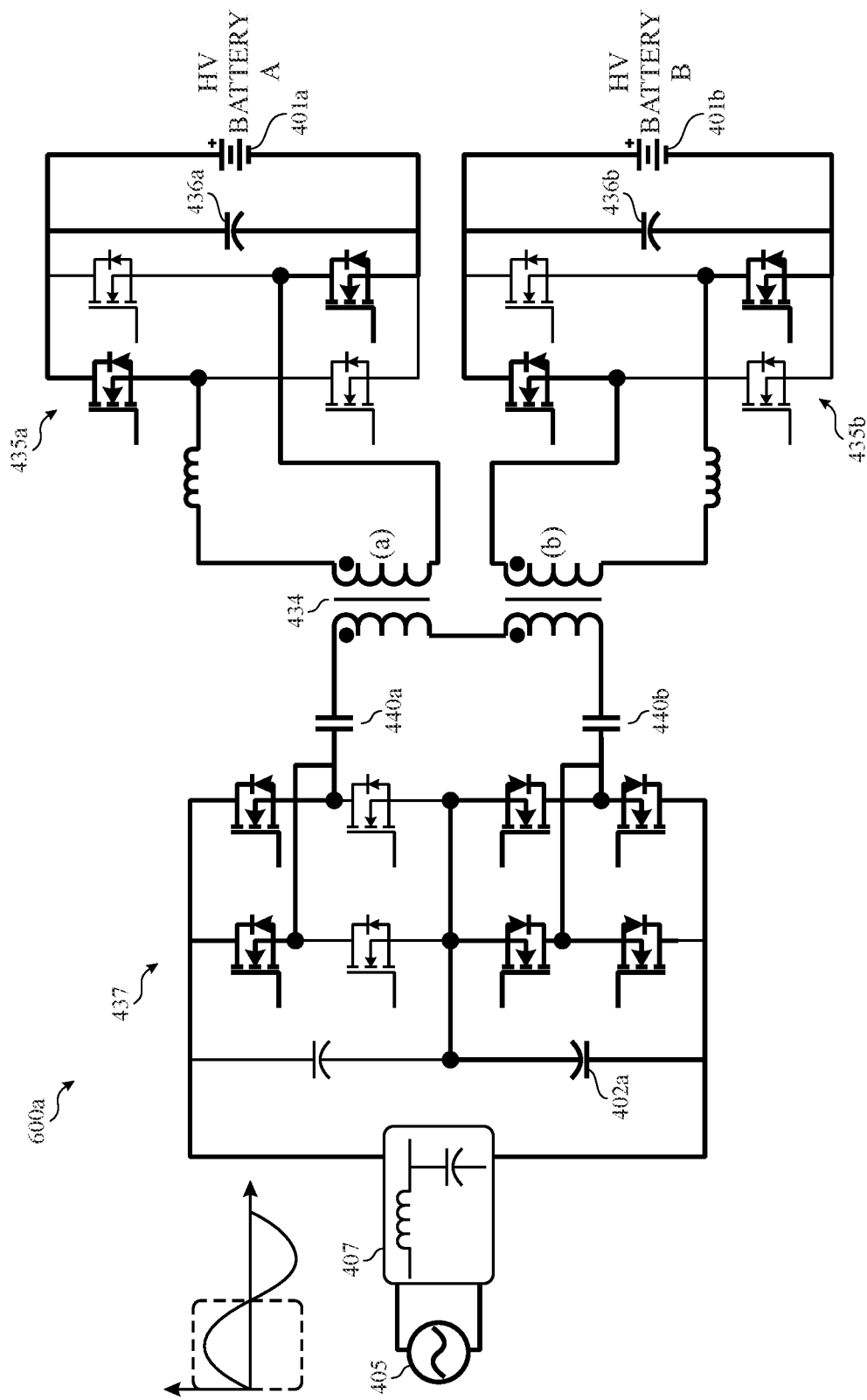
FIGS. 6A-6C illustrate a switching scheme for a half bridge single stage charger-balancer for a dual battery system.
Figure 6B:
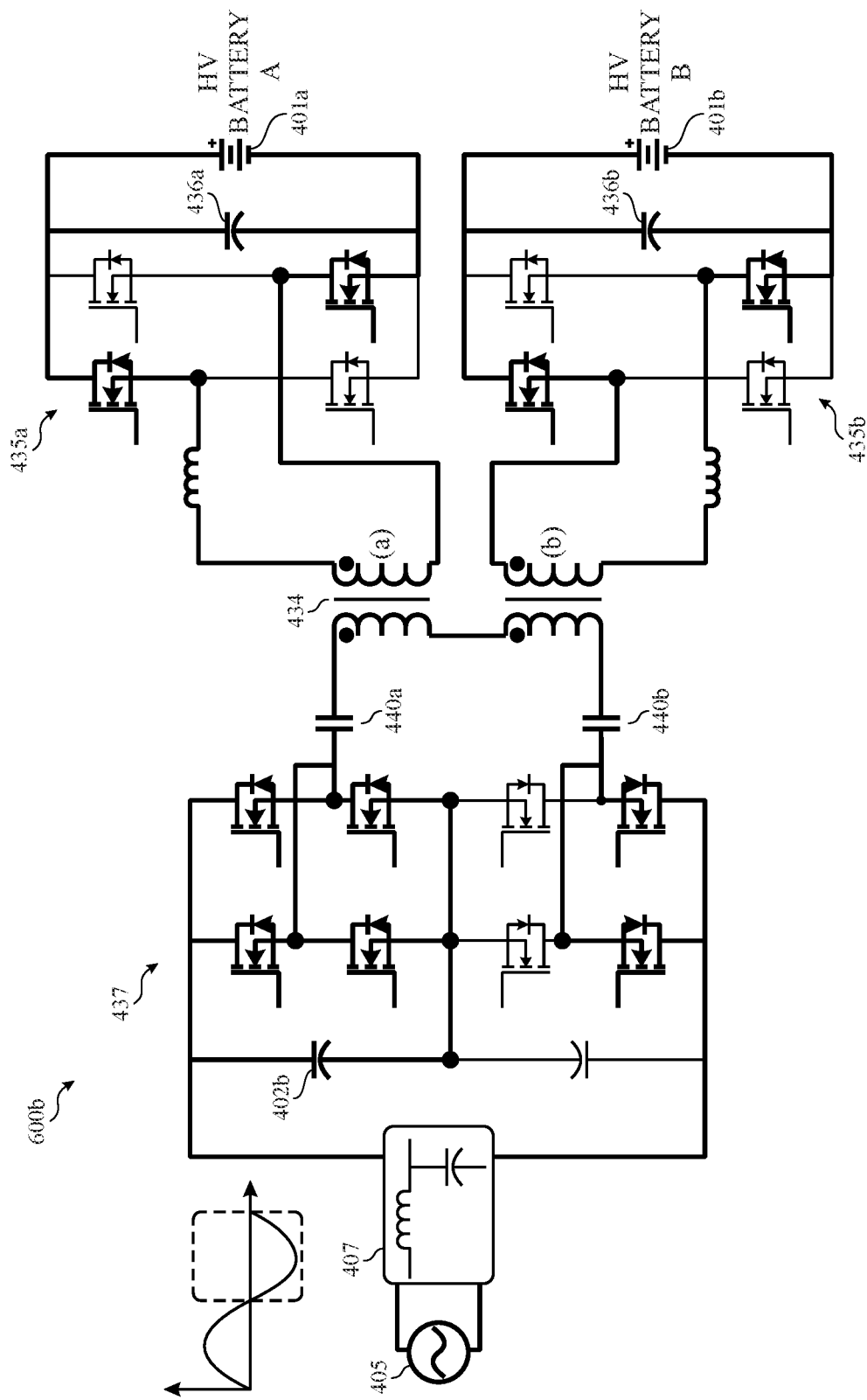

For purposes of the following description, there are at least three distinctions between full-bridge single stage charger with integrated balancer circuitry of FIGS. 3, 5A, and 5B and half-bridge single stage charger with integrated balancer circuitry of FIGS. 4, 6A, and 6b. First, as implied by the names of the circuits, the full-bridge arrangement includes a full bridge of switches on the AC input side, while the half-bridge arrangement includes dual half bridges of switches on the AC input side. Although this results in the same number of switching devices, operation of such circuits is different as described in greater detail below. Additionally, the full-bridge configuration includes four transformers 334a-334d (or a quad transformer), while the half-bridge configuration includes two transformers 434a-434b (or a dual transformer). Finally, the half-bridge embodiment includes blocking capacitors 440a-440b, which are not required in the full bridge embodiment.

With reference to FIG. 3, full bridge input circuitry 337 may be constructed from two full bridge circuits. A first/upper full bridge circuit may include switches SaP, SbP, SaN, SbN. First/upper full bridge circuit has an input terminal P coupled to one side of the AC input source and a neutral terminal N that is coupled in common to a second/lower full bridge circuit. This second/lower full bridge circuit may include switches Sa'Q, Sb'Q, Sa'N, and Sb'N. The second/lower full bridge circuit has an input terminal Q coupled to the other side of the AC input source and a neutral terminal N that is coupled in common to the first/upper full bridge circuit.

The first/upper full bridge circuit has two output terminals, output terminal "a" corresponding to the junction of switches SaP and SaN, and output terminal "b" corresponding to the junction of switches SbP and SbN. First output terminal "a" may be coupled to a first terminal of transformer primary winding 334a. Second output terminal "b" may be coupled to a second terminal of transformer primary winding 334c. Additionally, a second terminal of transformer primary winding 334a may be coupled to a first terminal of transformer primary winding 334c. This allows for a series connection of transformer windings 334a and 334c described in greater detail below with respect to FIG. 5A.

The second/lower full bridge circuit has two output terminals, output terminal "a'" corresponding to the junction of switches Sa'Q and Sa'N, and output terminal "b'" corresponding to the junction of switches Sb'Q and Sb'N. First output terminal "a'" may be coupled to a second terminal of transformer primary winding 334d. Second output terminal "b'" may be coupled to a first terminal of transformer primary winding 334b. Additionally, a first terminal of transformer primary winding 334d may be coupled to a second terminal of transformer primary winding 334b. This allows for a series connection of transformer windings 334b and 334d described in greater detail below with respect to FIG. 5B.

Turning to the secondary side of transformer 334, transformer secondary winding 334a may be coupled in series with transformer secondary winding 334b. Thus, a first terminal of transformer secondary winding 334a may be coupled to an input terminal "u" of first/upper output rectifier/charger 335a, which may be a full bridge rectifier made up of first switch pair S1 and second switch pair S2. A second terminal of transformer secondary winding 334a may be coupled to a first terminal of transformer secondary winding 334b. A second terminal of transformer secondary winding 334b may be coupled to an input terminal "v" of first/upper output rectifier charger 335a. First/upper rectifier charger 335a may be operated as described below with reference to FIGS. 5A and 5B provide a DC voltage for charging battery 301a and may further be operated as described below with reference to FIG. 5C to provide a balancing function as between batteries 301a and 301b.

Additionally, transformer secondary winding 334c may be coupled in series with transformer secondary winding 334d. Thus, a first terminal of transformer secondary winding 334c may be coupled to an input terminal "u" of second/lower output rectifier/charger 335b, which may be a full bridge rectifier made up of first switch pair S1 and second switch pair S2. A second terminal of transformer secondary winding 334c may be coupled to a first terminal of transformer secondary winding 334d. A second terminal of transformer secondary winding 334d may be coupled to an input terminal "v" of second/lower output rectifier charger 335b. Second/lower rectifier charger 335b may be operated as described below with reference to FIGS. 5A and 5B provide a DC voltage for charging battery 301a and may further be operated as described below with reference to FIG. 5C to provide a balancing function as between batteries 301a and 301b.

Finally, transformer 334 may be constructed in a variety of configurations. In one configuration, transformer 334 may include four separate transformers 334(a), 334(b), 334(c), and 334(d), with each transformer having an individual primary winding, secondary winding, and magnetic core, with the windings interconnected as described above. In another configuration, transformer 334 may be constructed as a single transformer having four primary windings (a)-(d), four secondary windings (a)-(d) and a common magnetic core, with the windings interconnected as described above. It will be appreciated by those skilled in the art that a variety of physical construction arrangements are possible for the single integrated transformer, with different numbers of core legs and different arrangements of the eight windings on those core legs. The particular arrangements depend upon the particular voltage, current, and power requirements of a given application as well as physical constraints such as packaging and thermal requirements. Thus, detailed transformer design information is not included here.

Figure 5C:
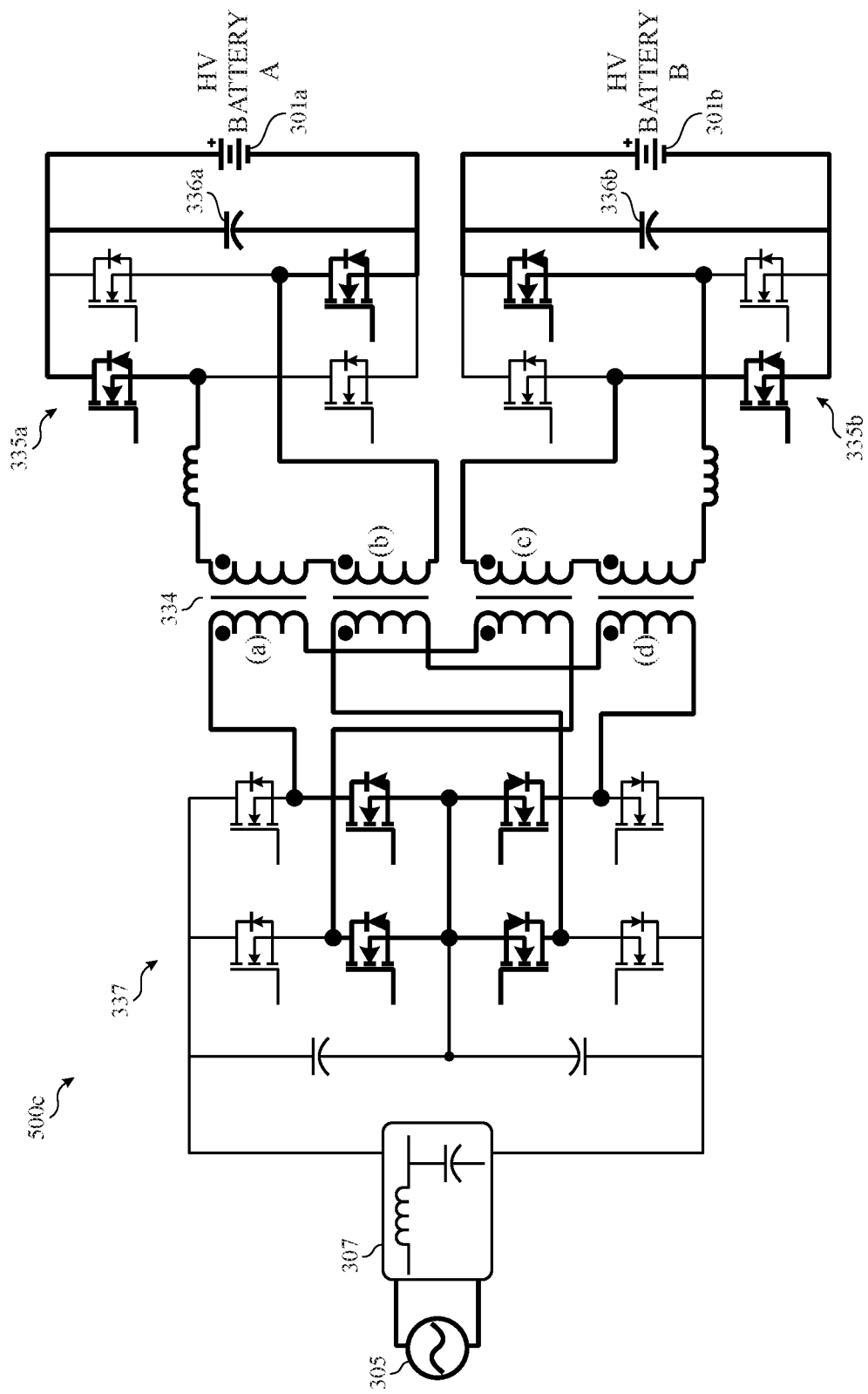

FIGS. 5A-5C illustrate operation of the full bridge single stage charger with integrated balancer described above with respect to FIG. 3. FIG. 5A illustrates the positive half cycle charging operation. FIG. 5B illustrates the negative half cycle charging operation. FIG. 5C illustrates the charge balancing operation.

FIG. 5A shows circuit configuration 500a for a positive half cycle charging operation for the full bridge single stage charger. During the positive half cycle of the input voltage from AC grid 305, all four switches of the second/lower full bridge are turned on/closed, providing a return current path from the transformer. In the upper full bridge, switches SaP and SbN may be switched together using a suitable pulse width modulation (PWM) algorithm to cause positive current flow from the AC grid 305, through switch SaP, through series connected transformer primary windings 334a and 334c, through upper full bridge switch SbN, returning to the AC grid 305 through the shorted second/lower bridge. This will provide a controllable AC voltage across transformer windings 334a and 334c, which will induce corresponding AC voltages in the series combination of transformer secondary windings 334a and 334b and in the series combination of transformer secondary windings 334c and 334d.

The voltage induced in the series combination of transformer secondary windings 334a and 334b may be used by rectifier/charger 335a to charge battery 301a in a manner similar to that described above with respect to FIG. 2A. Likewise, the voltage induced in the series combination of transformer secondary windings 334c and 334d may be used by rectifier/charger 335b to charge battery 301b in a manner similar to that described above with respect to FIG. 2A. More specifically, in rectifier/charger 335a, switch pair S1 may be closed while switch pair S2 remains open, providing a current path from the first terminal of transformer secondary winding 334a, through upper switch S1, through battery 301a, through lower switch S1, returning to the second terminal of transformer secondary winding 334b. Similarly, in rectifier/charger 335b, switch pair S2 may be closed while switch pair S1 remains open, providing a current path from the first terminal of transformer secondary winding 334c, through upper switch S2, through battery 301b, through lower switch S2, returning to the second terminal of transformer secondary winding 334d.

FIG. 5B shows circuit configuration 500b for a negative half cycle charging operation for the full bridge single stage charger. During the negative half cycle of the input voltage from AC grid 305, all four switches of the first/upper full bridge are turned on/closed, providing a return current path from the transformer. In the lower full bridge, switches Sa'Q and Sb'N may be switched together using a suitable pulse width modulation (PWM) algorithm to cause positive current flow from the AC grid 305, through switch Sa'Q, through series connected transformer primary windings 334b and 334d, through upper full bridge switch Sb'N, returning to the AC grid 305 through the shorted first/upper bridge. This will provide a controllable AC voltage across transformer windings 334b and 334d, which will induce corresponding AC voltages in the series combination of transformer secondary windings 334a and 334b and in the series combination of transformer secondary windings 334c and 334d.

The voltage induced in the series combination of transformer secondary windings 334a and 334b may be used by rectifier/charger 335a to charge battery 301a in a manner similar to that described above with respect to FIG. 2B and immediately above with respect FIG. 5A. Likewise, the voltage induced in the series combination of transformer secondary windings 334c and 334d may be used by rectifier/charger 335b to charge battery 301b in a manner similar to that described above with respect to FIG. 2B and immediately above with respect to FIG. 5A. More specifically, in rectifier/charger 335a, switch pair S1 may be closed while switch pair S2 remains open, providing a current path from the first terminal of transformer secondary winding 334a, through upper switch S1, through battery 301a, through lower switch S1, returning to the second terminal of transformer secondary winding 334b. Similarly, in rectifier/charger 335b, switch pair S2 may be closed while switch pair S1 remains open, providing a current path from the first terminal of transformer secondary winding 334c, through upper switch S2, through battery 301b, through lower switch S2, returning to the second terminal of transformer secondary winding 334d.

FIG. 5C shows circuit configuration 500c for a charge balancing operation for the full bridge single stage charger. In the charge balancing mode, the lower switches of each full bridge on the AC input side of the circuit (i.e., switches SaN, SbN, Sa'N and Sb'N) may be closed, while the upper switches of each full bridge (i.e., switches SaP, SbP, Sa'Q and Sb'Q) remain open. This effectively short circuits the series combination of transformer primary windings 334a and 334c, effectively short circuits the series combination of transformer primary windings 334b and 334d, and also effectively disconnects AC input source 305. As a result, transformer 334 is effectively reconfigured to couple the battery-side circuit corresponding to battery 301a to the battery-side circuit corresponding to battery 301b.

One of rectifier/charger bridges 335a or 335b may then be operated as an inverter to drive transformer 334 with energy from the battery having excess charge, with the other rectifier/charger bridge being operated as a rectifier to allow energy from transformer 334 to be delivered to the battery having a charge deficit. For example, the switches of rectifier/charger 335a may be operated using a pulse width modulation algorithm to generate a desired voltage across the series combination of transformer secondary windings 334a and 334b, which may act as the primary winding for a charge balancing transfer from battery 301a to battery 301b. Then, the series combination of transformer secondary windings 334c and 334d will act as the secondary windings for a charge balancing transfer from battery 301a to battery 301b. In the positive half cycle of such an operation, switches S1 of charger 335a may be used to generate the positive half cycle of the AC charge balancing voltage with switches S2 of charger 335a being used to generate the negative half cycle of the AC charge balancing voltage. On the rectifier side (i.e., the battery circuit corresponding to battery 301b), switches S2 may be closed to rectify the positive voltage appearing across the series combination of secondary windings 334c and 334d to deliver charging current to battery 301b, with switches S1 of charger 335b being used to rectify the negative half cycle of the AC charge balancing voltage.

With reference to FIG. 4, dual half bridge input circuitry 437 may be constructed from two half bridge circuit pairs, each including two half bridges connected in parallel. A first/upper dual half bridge circuit may include switch pairs SaP and SaN. First/upper dual half bridge circuit has an input terminal P coupled to one side of the AC input source and a neutral terminal N that is coupled in common to a second/lower full bridge circuit. This second/lower dual half bridge circuit may include switch pairs SbQ and SbN. The second/lower dual half bridge circuit has an input terminal Q coupled to the other side of the AC input source and a neutral terminal N that is coupled in common to the first/upper dual half bridge circuit.

The first/upper dual half bridge circuit has two output terminals, output terminal "a" corresponding to the junction of left switch pair SaP and SaN, and output terminal "a'" corresponding to the junction of right switch pair SaP and SaN. First output terminal "a" may be coupled to a first terminal of transformer primary winding 434a via a blocking capacitor 440a. Second output terminal "a'" may be coupled to the same first terminal of transformer primary winding 434a, also via blocking capacitor 440a.

The second/lower dual half bridge circuit has two output terminals, output terminal "b" corresponding to the junction of left switch pair SbQ and SbN, and output terminal "b'" corresponding to the junction of right switch pair SbQ and SbN. First output terminal "b" may be coupled to a second terminal of transformer primary winding 434b via a blocking capacitor 440b. Second output terminal "b'" may be coupled to the same second terminal of transformer primary winding 434b, also via blocking capacitor 440b. Additionally, a first terminal of transformer primary winding 434b may be coupled to a second terminal of transformer primary winding 434a. This allows for a series connection of transformer windings 434a and 434b described in greater detail below with respect to FIGS. 6A and 6B.

Turning to the secondary side of transformer 434, transformer secondary winding 434a may be coupled to rectifier/charger circuit 435a corresponding to first battery 401a.

Thus, a first terminal of transformer secondary winding 434a may be coupled to an input terminal "u" of first/upper output rectifier/charger 435a, which may be a full bridge rectifier made up of first switch pair S1 and second switch pair S2. A second terminal of transformer secondary winding 434a may be coupled to an input terminal "v" of first/upper output rectifier/charger 435a. First/upper rectifier charger 435a may be operated as described below with reference to FIGS. 6A and 6B provide a DC voltage for charging battery 301a and may further be operated as described below with reference to FIG. 6C to provide a balancing function as between batteries 401a and 401b.

Additionally, transformer secondary winding 334b may be coupled to rectifier/charger circuit 435b corresponding to second battery 401b. Thus, a first terminal of transformer secondary winding 434b may be coupled to an input terminal "u" of second/lower output rectifier/charger 435b, which may be a full bridge rectifier made up of first switch pair S1 and second switch pair S2. A second terminal of transformer secondary winding 434b may be coupled to an input terminal "v" of second/lower output rectifier charger 435b. Second/lower rectifier charger 435b may be operated as described below with reference to FIGS. 6A and 6B provide a DC voltage for charging battery 401a and may further be operated as described below with reference to FIG. 6C to provide a balancing function as between batteries 401a and 401b.

Finally, transformer 434 may be constructed in a variety of configurations. In one configuration, transformer 434 may include two separate transformers 434(a), and 434(b), with each transformer having an individual primary winding, secondary winding, and magnetic core, with the windings interconnected as described above. In another configuration, transformer 434 may be constructed as a single transformer having two primary windings (a)-(b), two secondary windings (a)-(b) and a common magnetic core, with the windings interconnected as described above. It will be appreciated by those skilled in the art that a variety of physical construction arrangements are possible for the single integrated transformer, with different numbers of core legs and different arrangements of the four windings on those core legs. The particular arrangements depend upon the particular voltage, current, and power requirements of a given application as well as physical constraints such as packaging and thermal requirements. Thus, detailed transformer design information is not included here.

Figure 6C:
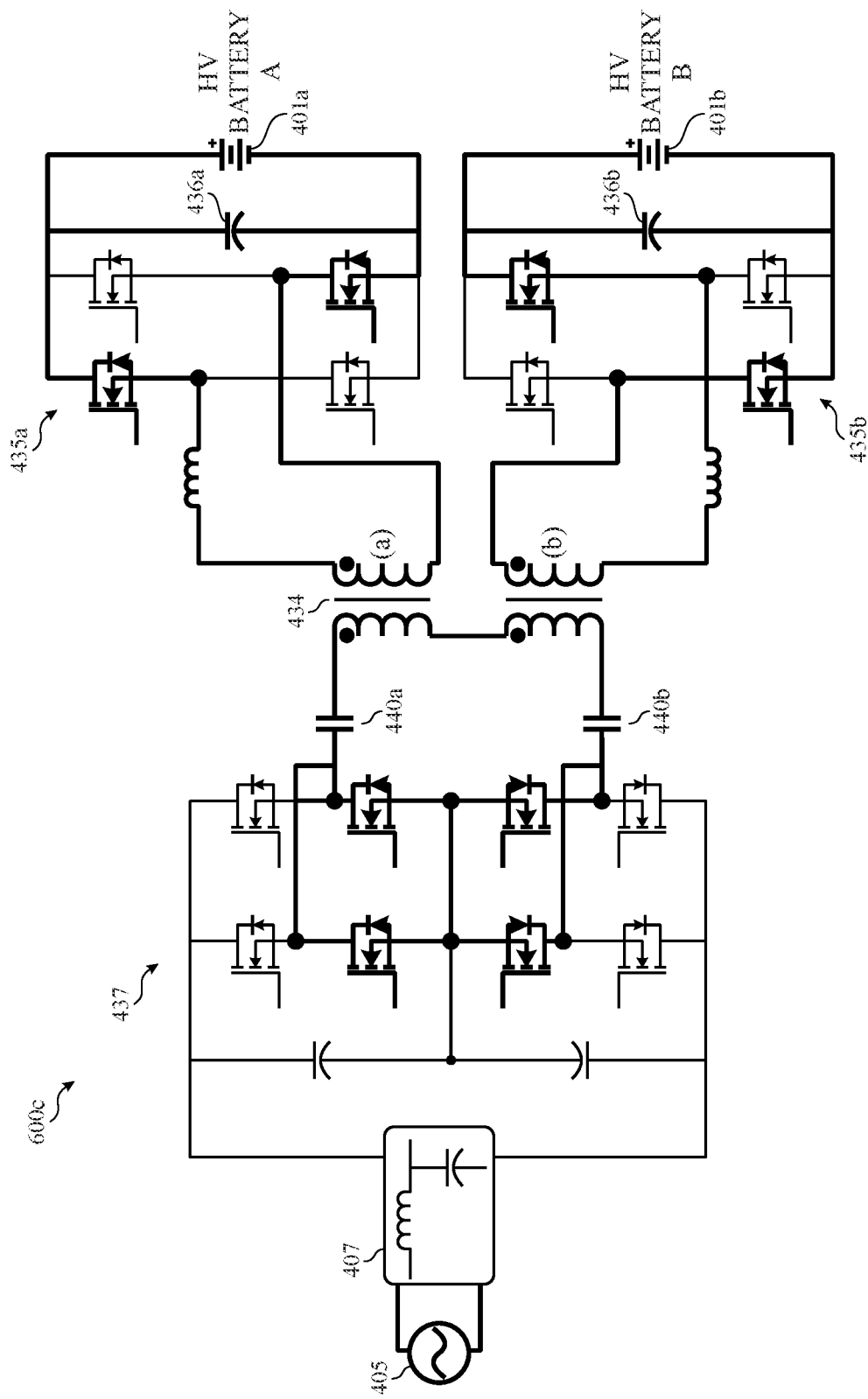

FIGS. 6A-6C illustrate operation of the dual-half bridge single stage charger with integrated balancer described above with respect to FIG. 4. FIG. 6A illustrates the positive half cycle charging operation. FIG. 6B illustrates the negative half cycle charging operation. FIG. 6C illustrates the charge balancing operation.

FIG. 6A shows circuit configuration 600a for a positive half cycle charging operation for the dual half bridge single stage charger. During the positive half cycle of the input voltage from AC grid 405, all four switches of the second/lower dual half bridge are turned on/closed, providing a return current path from the transformer. In the upper dual half bridge, switches SaP may be switched together using a suitable pulse width modulation (PWM) algorithm to cause positive current flow from the AC grid 405, through switches SaP, through blocking capacitor 440a, through series connected transformer primary windings 434a and 434b, through blocking capacitor 440b, returning to the AC grid 405 through the shorted second/lower dual half bridges. This will provide a controllable AC voltage across transformer windings 434a and 434b, which will induce corresponding AC voltages in the transformer secondary windings 334a and 334b.

The voltage induced in transformer secondary winding 434a may be used by rectifier/charger 435a to charge battery 401a in a manner similar to that described above with respect to FIG. 2A. Likewise, the voltage induced in transformer secondary winding 434b may be used by rectifier/charger 435b to charge battery 401b in a manner similar to that described above with respect to FIG. 2A. More specifically, in rectifier/charger 435a, switch pair S1 may be closed while switch pair S2 remains open, providing a current path from the first terminal of transformer secondary winding 434a, through upper switch S1, through battery 301a, through lower switch S1, returning to the second terminal of transformer secondary winding 434a. Similarly, in rectifier/charger 435b, switch pair S2 may be closed while switch pair S1 remains open, providing a current path from the first terminal of transformer secondary winding 434b, through upper switch S2, through battery 401b, through lower switch S2, returning to the second terminal of transformer secondary winding 434b.

FIG. 6B shows circuit configuration 600b for a negative half cycle charging operation for the dual half bridge single stage charger. During the negative half cycle of the input voltage from AC grid 405, all four switches of the first/upper dual half bridge are turned on/closed, providing a return current path from the transformer. In the lower full bridge, switches SbQ may be switched together using a suitable pulse width modulation (PWM) algorithm to cause positive current flow from the AC grid 405, through switches SbQ, through blocking capacitor 440b, through series connected transformer primary windings 434a and 434b, through blocking capacitor 440a, returning to the AC grid 405 through the shorted first/upper dual half bridges. This will provide a controllable AC voltage across transformer windings 434a and 434b, which will induce corresponding AC voltages in transformer secondary windings 434a and 434b.

Similarly to the description above with respect to FIG. 6A, the voltage induced in transformer secondary winding 434a may be used by rectifier/charger 435a to charge battery 401a in a manner similar to that described above with respect to FIG. 2B and immediately above with respect FIG. 6A. Likewise, the voltage induced in transformer secondary winding 434b may be used by rectifier/charger 435b to charge battery 401b in a manner similar to that described above with respect to FIG. 2B and immediately above with respect to FIG. 6A. More specifically, in rectifier/charger 435a, switch pair S1 may be closed while switch pair S2 remains open, providing a current path from the first terminal of transformer secondary winding 434a, through upper switch S1, through battery 401a, through lower switch S1, returning to the second terminal of transformer secondary winding 434a. Similarly, in rectifier/charger 435b, switch pair S2 may be closed while switch pair S1 remains open, providing a current path from the first terminal of transformer secondary winding 434b, through upper switch S2, through battery 401b, through lower switch S2, returning to the second terminal of transformer secondary winding 434b.

FIG. 6C shows circuit configuration 600c for a charge balancing operation for the dual half bridge single stage charger. In the charge balancing mode, the lower switches of each half bridge on the AC input side of the circuit (i.e., switches SaN and SbN) may be closed, while the upper switches of each half bridge (i.e., switches SaP and SbP) remain open. This effectively short circuits the series combination of transformer primary windings 434a and 434b and blocking capacitors 440a and 440b, and also effectively disconnects AC input source 405. As a result, transformer 434 is effectively reconfigured to couple the battery-side circuit corresponding to battery 401a to the battery-side circuit corresponding to battery 401b.

One of rectifier/charger bridges 435a or 435b may then be operated as an inverter to drive transformer 434 with energy from the battery having excess charge, with the other rectifier/charger bridge being operated as a rectifier to allow energy from transformer 434 to be delivered to the battery having a charge deficit. For example, the switches of rectifier/charger 435a may be operated using a pulse width modulation algorithm to generate a desired voltage across transformer secondary winding 434a, which may act as the primary winding for a charge balancing transfer from battery 401a to battery 401b. Then, transformer secondary windings 434b will act as the secondary windings for a charge balancing transfer from battery 401a to battery 4301b. In the positive half cycle of such an operation, switches S1 of charger 435a may be used to generate the positive half cycle of the AC charge balancing voltage with switches S2 of charger 435a being used to generate the negative half cycle of the AC charge balancing voltage. On the rectifier side (i.e., the battery circuit corresponding to battery 401b), switches S2 may be closed to rectify the positive voltage appearing across secondary winding 434b to deliver charging current to battery 401b, with switches S1 of charger 435b being used to rectify the negative half cycle of the AC charge balancing voltage.

Figure 8:
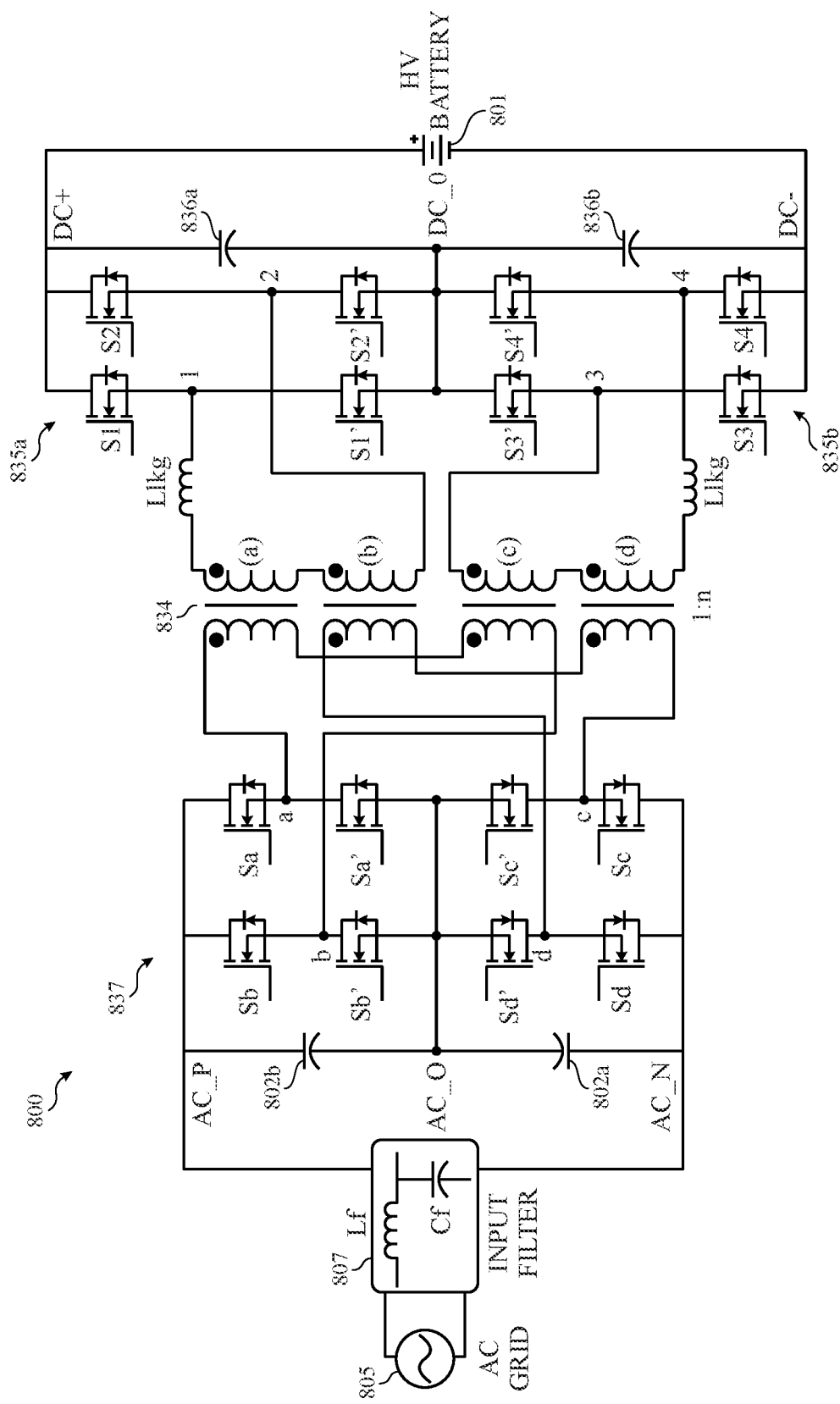
FIG. 8 illustrates a full bridge single stage charger for a single battery system.

The foregoing embodiments relate to multi-battery systems and therefore include the balancer circuitry/modes of operation described above. However, the single stage chargers described above may also be used in systems incorporating only a single battery. In those cases, the balancer functionality may be omitted while still achieving some of the aforementioned advantages. One such single stage charger for a single battery system is illustrated in FIG. 8, with its switching operations depicted in FIGS. 9A and 9B. At a high level, the system of FIGS. 8, 9A and 9B may be understood as generally similar to the system described above with respect to FIGS. 3, 5A, and 5B, except that the two batteries 301a and 301b have been connected in series and the lower rail of rectifier/charger 335a has been connected to the upper rail of rectifier charger 335b, as described in greater detail below.

FIG. 8 illustrates a single-battery AC-DC system 800 including an improved single stage charger. System 800 includes a single battery 801. In at least some embodiments this battery may be a high voltage battery, e.g., a battery having voltage on the order of a few hundred to several hundred volts, though other voltage are also possible. System 800 may be configured to receive AC input power from an AC grid 805 via an input filter 807. Construction of such input filters is known to those skilled in the art and is therefore not repeated here. System 800 further includes an integrated charger configuration including full bridge input circuitry 837, transformer 834, and rectifier/chargers 835a/835b, operation of which is discussed below with respect to FIGS. 9A and 9B.

Full bridge input circuitry 837 may be constructed from two full bridge circuits. A first/upper full bridge circuit may include switches Sa, Sb, Sa', Sb'. First/upper full bridge circuit has an input terminal AC_P coupled to one side of the AC input source and a central terminal AC_0 that is coupled in common to a second/lower full bridge circuit. This second/lower full bridge circuit may include switches Sc, Sd, Sc', and Sd'. The second/lower full bridge circuit has an input/neutral terminal AC_N coupled to the other side of the AC input source and a central terminal AC_0 that is coupled in common to the first/upper full bridge circuit. The illustrated embodiment corresponds to a single phase AC input. Other configurations may be used if another AC input configuration is provided, such as a split phase AC input or a polyphase (e.g., three-phase) AC input.

The first/upper full bridge circuit has two output terminals, output terminal "a" corresponding to the junction of switches Sa and Sa', and output terminal "b" corresponding to the junction of switches Sb and Sb'. First output terminal "a" may be coupled to a first terminal of transformer primary winding 834a. Second output terminal "b" may be coupled to a second terminal of transformer primary winding 834c. Additionally, a second terminal of transformer primary winding 834a may be coupled to a first terminal of transformer primary winding 834c. This allows for a series connection of transformer windings 834a and 834c described in greater detail below with respect to FIG. 9A.

The second/lower full bridge circuit has two output terminals, output terminal "c" corresponding to the junction of switches Sc and Sc', and output terminal "d'" corresponding to the junction of switches Sd and Sd'. First output terminal "c" may be coupled to a second terminal of transformer primary winding 834d. Second output terminal "d'" may be coupled to a first terminal of transformer primary winding 834b. Additionally, a first terminal of transformer primary winding 834d may be coupled to a second terminal of transformer primary winding 834b. This allows for a series connection of transformer windings 834b and 834d described in greater detail below with respect to FIG. 9B. This configuration is also similar to that discussed above with respect to FIG. 3.

Turning to the secondary side of transformer 834, transformer secondary winding 834a may be coupled in series with transformer secondary winding 834b. Thus, a first terminal of transformer secondary winding 834a may be coupled to an input terminal "1" of first/upper output rectifier/charger 835a, made up of first switch pair S1/S1' and second switch pair S2/S2'. (Input terminal 1 is the junction of switches S1/S1'.) A second terminal of transformer secondary winding 834a may be coupled to a first terminal of transformer secondary winding 834b. A second terminal of transformer secondary winding 834b may be coupled to an input terminal "2" of first/upper output rectifier charger 835a. (Input terminal 2 is the junction of switches S2/S2'.) First/upper rectifier charger 835a may be operated as described below with reference to FIGS. 9A and 9B to provide a DC voltage for charging battery 801.

Additionally, transformer secondary winding 834c may be coupled in series with transformer secondary winding 834d. Thus, a first terminal of transformer secondary winding 834c may be coupled to an input terminal "3" of second/lower output rectifier/charger 835b, which may include first switch pair S3/S3' and second switch pair S4/S4'. (Input terminal 3 is the junction of switches S3/S3'.) A second terminal of transformer secondary winding 334c may be coupled to a first terminal of transformer secondary winding 334d. A second terminal of transformer secondary winding 334d may be coupled to an input terminal "4" of second/lower output rectifier charger 835b. Second/lower rectifier charger 835b may be operated as described below with reference to FIGS. 9A and 9B provide a DC voltage for charging battery 801.

Finally, transformer 834 may be constructed in a variety of configurations. In one configuration, transformer 834 may include four separate transformers 834(a), 834(b), 834(c), and 834(*d*), with each transformer having an individual primary winding, secondary winding, and magnetic core, with the windings interconnected as described above. In another configuration, transformer 834 may be constructed as a single transformer having four primary windings (a)-(d), four secondary windings (a)-(d), and a common magnetic core, with the windings interconnected as described above. A variety of physical construction arrangements are possible for the single integrated transformer, with different numbers of core legs and different arrangements of the eight windings on those core legs. The particular arrangements depend upon the particular voltage, current, and power requirements of a given application as well as physical constraints such as packaging and thermal requirements. Thus, detailed transformer design information is not included here.

Figure 9A:
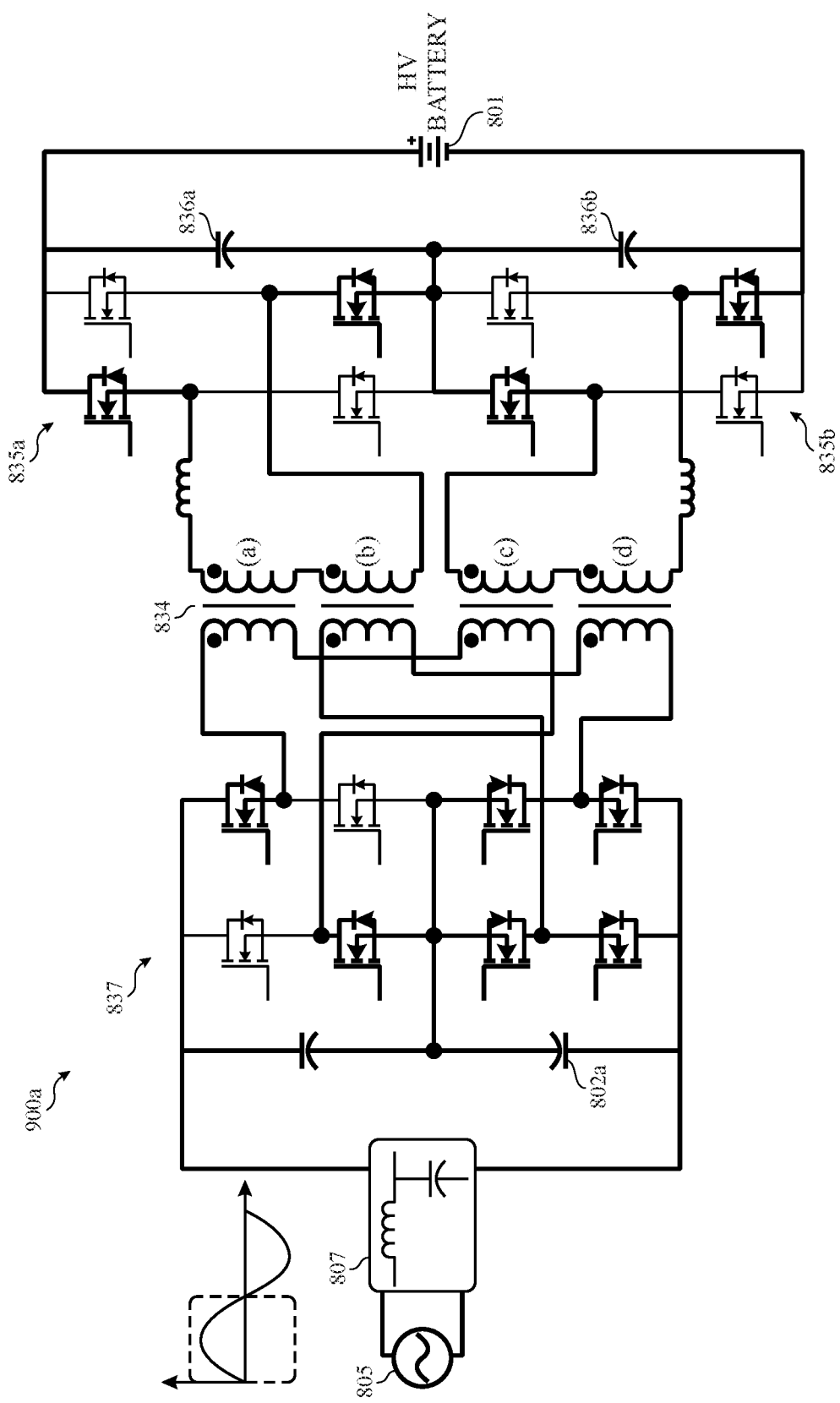
FIGS. 9A-9B illustrate a switching scheme for a full bridge single stage charger for a single battery system.
Figure 9B:
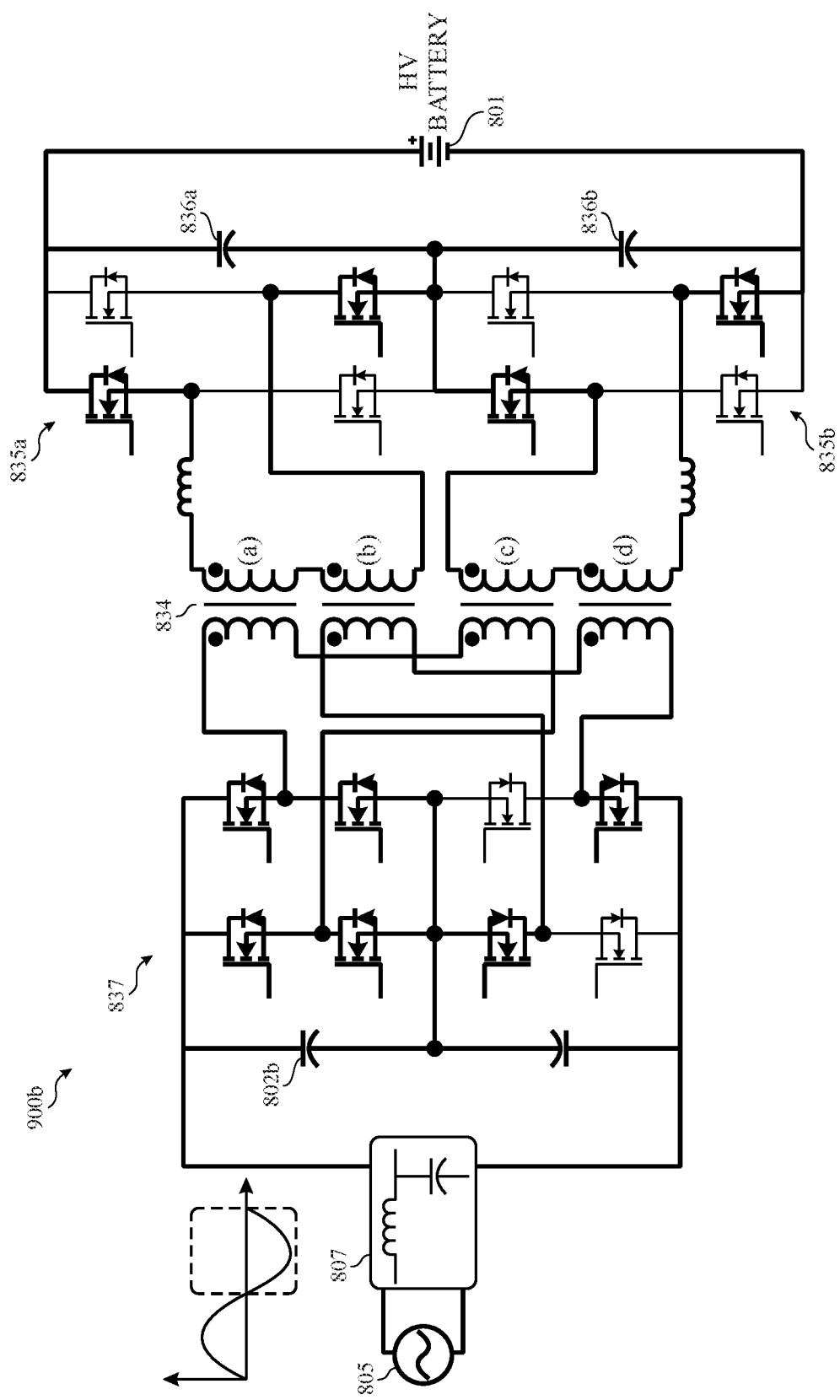

FIGS. 9A-9B illustrate operation of the full bridge single stage charger described above with respect to FIG. 8. FIG. 9A illustrates the positive half cycle charging operation. FIG. 9B illustrates the negative half cycle charging operation.

FIG. 9A shows circuit configuration 900*a* for a positive half cycle charging operation for the full bridge single stage charger. During the positive half cycle of the input voltage from AC grid 805, all four switches of the second/lower full bridge are turned on/closed, providing a return current path from the transformer. In the upper full bridge, switches Sa and Sb' may be switched together using a suitable pulse width modulation (PWM) algorithm to cause positive current flow from the AC grid 805, through switch Sa, through series connected transformer primary windings 834*a* and 834*c*, through upper full bridge switch Sb', returning to the AC grid 805 through the shorted second/lower bridge. This will provide a controllable AC voltage across transformer windings 834*a* and 834*c*, which will induce corresponding AC voltages in the series combination of transformer secondary windings 834*a* and 834*b* and in the series combination of transformer secondary windings 834*c* and 834*d*.

The voltage induced in the series combination of transformer secondary windings 834*a*-834*d* may be used by rectifier/chargers 835*a* and 835*b* to charge battery 801 in a manner similar to that described above. More specifically, in rectifier/charger 835*a*, switches S1 and S2' may be closed while switches S1' and S2 remain open. Similarly, in rectifier/charger 835*b*, switches S3' and S4 may be closed while switches S3 and S4' remain open. This provides a current path from the first terminal of transformer secondary winding 834*a*, through upper switch S1, through battery 801, through lower switch S4, returning to the second terminal of transformer secondary winding 834*d*. Additionally, switches S2' and S3 provide for a series combination of the series combination of secondary windings 834*a* and 834*b* with the series combination of secondary windings 834*c* and 834*d*. In other words, all of secondary windings 834*a*-834*b* are connected in series, allowing the sum of the voltages across all four windings to be applied to battery 801 (and series capacitors 836*a*/836*b*).

FIG. 9B shows circuit configuration 900*b* for a negative half cycle charging operation for the full bridge single stage charger. During the negative half cycle of the input voltage from AC grid 805, all four switches of the first/upper full bridge are turned on/closed, providing a return current path from the transformer. In the lower full bridge, switches Sc and Sd' may be switched together using a suitable pulse width modulation (PWM) algorithm to cause positive current flow from the AC grid 805, through switch Sc, through series connected transformer primary windings 834*b* and 834*d*, through upper full bridge switch Sd', returning to the AC grid 805 through the shorted second/lower bridge. This will provide a controllable AC voltage across transformer windings 834*b* and 834*d*, which will induce corresponding AC voltages in the series combination of transformer secondary windings 834*b* and 834*d* and in the series combination of transformer secondary windings 834*a* and 834*b*.

The voltage induced in the series combination of transformer secondary windings 834*a*-834*d* may be used by rectifier/chargers 835*a* and 835*b* to charge battery 801 in a manner similar to that described above. More specifically, in rectifier/charger 835*a*, switches S1 and S2' may be closed while switches S1' and S2 remain open. Similarly, in rectifier/charger 835*b*, switches S3' and S4 may be closed while switches S3 and S4' remain open. This provides a current path from the first terminal of transformer secondary winding 834*a*, through upper switch S1, through battery 801, through lower switch S4, returning to the second terminal of transformer secondary winding 834*d*. Additionally, switches S2' and S3 provide for a series combination of the series combination of secondary windings 834*a* and 834*b* with the series combination of secondary windings 834*c* and 834*d*. In other words, all of secondary windings 834*a*-834*b* are connected in series, allowing the sum of the voltages across all four windings to be applied to battery 801 (and series capacitors 836*a*/836*b*).

Figure 7:
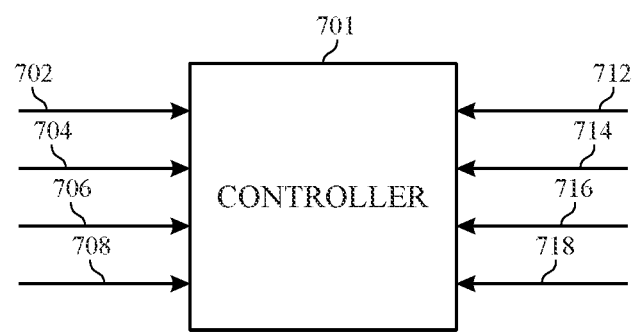
FIG. 7 illustrates a high level block diagram of a controller for a single stage charger-balancer for a dual battery system.

FIG. 7 illustrates a high level block diagram of a controller 701 that may be used in conjunction with the various embodiments described above. Controller 701 may be implemented using any combination of analog control circuitry, digital/discrete control circuitry, programmable processors and/or controllers, etc. Controller 701 may be configured with a plurality of inputs 702, 704, 706, 708 that correspond to various measured circuit parameters. Although four inputs are shown, any number of inputs may be provided as appropriate for a given embodiment. For example, inputs may include, input (grid) voltage and current, battery voltage and current, battery temperature, etc. Controller 701 may use these inputs together with its internal circuitry and/or programming to generate output control signals 712, 714, 716, and 718 that may be used to operate the switches in the manner described above. Although four outputs are shown, any number of outputs may be provided as appropriate for a given embodiment. For example, outputs might include drive signals for the switches of an upper input bridge, drive signals for the switches of a lower input bridge, drive signals for a first rectifier/charger, drive signals for the switches of a second rectifier/charger, etc. as described above. Numerous variations are possible depending on the particular objectives and requirements of a given embodiment, and are thus not repeated here.

The foregoing embodiments of systems with single stage chargers for use in single battery systems and for single stage chargers having integrated balancer functionality for use in multi battery systems provide a variety of benefits over the prior art and provide for various tradeoffs among themselves. For example, the full bridge embodiments of FIGS. 3 and 5A-5C require a more complex transformer configuration and an arguably more complex switching operation on the primary side, while eliminating the blocking capacitors. Alternatively, the dual-half bridge embodiments of FIGS. 4 and 6A-6C provide for simpler transformer configuration and simplified switching control on the primary side, but requires the additional blocking capacitors. As another example, the single battery embodiment described with reference to FIGS. 8, 9A, and 9B can eliminate blocking capacitors, operate at higher voltages (for a given switching device rating) and operate with a variable AC duty cycle resulting in a wider range of operating voltages as compared to a conventional stacked half bridge converter. Each embodiment may have further advantages and disadvantages rendering it more suitable or less suitable for a given application. Additionally, although the foregoing embodiments have been described with respect to dual battery systems, it will be appreciated that the teachings herein may be extended to multi-battery systems including more than two batteries. Additionally, the switching topologies disclosed herein are exemplary, and other topologies of rectifiers, inverters, and other converters may be used as appropriate. Finally, as noted above, various switch types (diodes, thyristors, IGBTs, MOSFETs, etc.) implemented in various semiconductor technologies (Si, SiC, GaN, etc.) may be used as appropriate for a given application.

The foregoing describes exemplary embodiments of single stage chargers, some for use in single battery systems and some for use in multi battery systems, with the latter having integrated charge balancing functionality. Such systems may be used in a variety of applications but may be particularly advantageous when used in conjunction with relatively high voltage and/or high power systems, such as may be used in electric vehicles, grid storage batteries, photovoltaic systems, and the like Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A charger for a battery power system, the charger comprising:
   at least first and second switching bridges each having an input terminal configured to be coupled to an AC input power source and commonly coupled neutral terminals;
   at least one transformer having two or more primary windings connected in series and coupled to the at least first and second switching bridges, the at least one transformer further comprising at least two secondary windings; and
   at least first and second rectifier and chargers each coupled to at least one of the secondary windings and configured to be coupled to a battery;
   wherein:
      the first switching bridge is operable during a positive half cycle of the AC input power source to deliver an AC voltage to the at least one transformer, and the second switching bridge is operable during a negative half cycle of the input power source to deliver an AC voltage to the at least one transformer; and
      the first and second rectifier and chargers are operable in a first mode to receive an AC voltage from the at least one transformer and deliver a DC voltage for charging the battery.

2. The charger of claim 1 wherein the charger is a charger and balancer for a multi battery system and wherein the first and second rectifier and chargers are operable in a second mode to convert a DC voltage from a respective battery to an AC voltage delivered to the at least one transformer to balance charge between a first and a second batteries.

3. The charger of claim 1 wherein the first and second switching bridges are each full bridges comprising four switching devices.

4. The charger of claim 3 wherein the at least one transformer comprises four transformers each having a primary winding and a secondary winding, and:
   a first series connected primary winding comprises the primary winding of a first transformer coupled in series with the primary winding of a third transformer;
   a second series connected primary winding comprises the primary winding of a second transformer coupled in series with the primary winding of a fourth transformer; and
   the at least two secondary windings include a first series connected secondary winding comprising the secondary winding of the first transformer coupled in series with the secondary winding of the second transformer and a second series connected secondary winding comprising the secondary winding of the third transformer coupled in series with the secondary winding of the fourth transformer.

5. The charger of claim 4 wherein the first rectifier and charger is coupled to the first series connected secondary winding and the second rectifier and charger is coupled to the second series connected secondary winding.

6. The charger of claim 4 wherein the at least one transformer comprises a single transformer having four primary windings and four corresponding secondary windings, and:
   a first series connected primary winding comprises a first primary winding coupled in series with a third primary winding;
   a second series connected primary winding comprises a second primary winding coupled in series with a fourth primary winding; and
   the at least two secondary windings include a first series connected secondary winding comprising a first secondary winding coupled in series with a second secondary winding and a second series connected secondary winding comprising a third secondary winding coupled in series with a fourth secondary winding.

7. The charger of claim 4 wherein the first rectifier and charger is coupled to the first series connected secondary winding and the second rectifier and charger is coupled to the second series connected secondary winding.

8. The charger of claim 1 wherein the first and second rectifier and chargers are full bridges comprising four switching devices.

9. A charger for a battery power system, the charger comprising:
   first and second switching bridges coupled to an AC input power source;
   at least one transformer having at least one pair of series connected primary windings coupled to the first and second switching bridges, the at least one transformer further having at least two secondary windings;
   first and second rectifier and chargers each coupled to at least one of the secondary windings and configured to be coupled respectively to a first and second battery; and
   a controller configured to:
      operate the first switching bridge during a positive half cycle of the input power source to deliver AC voltage to the at least one transformer;
      operate the second switching bridge during a negative half cycle of the input power source to deliver AC voltage to the at least one transformer; and operate the first and second rectifier and chargers in a first mode to convert AC voltage from the at least one transformer to DC voltage for charging the battery.

10. The charger of claim 9 wherein the charger is a charger and balancer for a multi battery system and wherein the controller is further configured to operate the first and second rectifier and chargers in a second mode to convert DC voltage from a respective battery to an AC voltage delivered to the at least one transformer to balance charge between the first and second batteries.

11. The charger of claim 9, wherein the controller is further configured to:
operate the first switching bridge during a positive half cycle of the input power source to deliver AC voltage to the at least one transformer by closing all switches of the second switching bridge and operating the switches of the first switching bridge to deliver a pulse width modulated AC voltage to the at least one transformer;
operate the second switching bridge during a negative half cycle of the input power source to deliver AC voltage to the at least one transformer by closing all switches of the second switching bridge and operating the switches of the second switching bridge to deliver a pulse width modulated AC voltage to the at least one transformer.

12. A method of providing charging to a battery system, the method comprising:
operating a first switching bridge during a positive half cycle of an input power source to deliver AC voltage to at least one transformer having at least two primary windings connected in series;
operating a second switching bridge during a negative half cycle of the input power source to deliver AC voltage to the at least one transformer; and
operating first and second rectifier and chargers in a first mode to convert AC voltage from the at least one transformer to DC voltage for charging a battery.

13. The method of claim 12, wherein:
operating the first switching bridge during a positive half cycle of the input power source to deliver AC voltage to the at least one transformer comprises closing all switches of the second switching bridge and operating the switches of first switching bridge to deliver a pulse width modulated AC voltage to the at least one transformer; and
operating the second switching bridge during a negative half cycle of the input power source to deliver AC voltage to the at least one transformer comprises closing all switches of the second switching bridge and operating the switches of the second switching bridge to deliver a pulse width modulated AC voltage to the at least one transformer.

14. The method of claim 12 wherein method further comprises providing balancing to a dual battery system by operating the first and second rectifier and chargers in a second mode to convert DC voltage from a respective battery to an AC voltage delivered to the at least one transformer to balance charge between first and second batteries.

15. The method of claim 12, wherein operating the first and second rectifier and chargers in a second mode to convert DC voltage from a respective battery to an AC voltage delivered to the at least one transformer to balance charge between first and second batteries comprises closing all switches of the first and second switching bridges and operating one of the first and second rectifier and chargers as an inverter to deliver a pulse width modulated AC voltage to the at least one transformer while operating the other of the first and second rectifier and chargers in the first mode.

* * * * *